US008725832B2

(12) United States Patent
Bartholomew

(10) Patent No.: US 8,725,832 B2
(45) Date of Patent: *May 13, 2014

(54) SYSTEM AND METHOD FOR CREATING AND POSTING MEDIA LISTS FOR PURPOSES OF SUBSEQUENT PLAYBACK

(75) Inventor: Alan Bartholomew, Pasadena, CA (US)

(73) Assignee: Trio Systems, LLC, Pasadena, CA (US)

( * ) Notice: Subject to any disclaimer, the term of this patent is extended or adjusted under 35 U.S.C. 154(b) by 437 days.

This patent is subject to a terminal disclaimer.

(21) Appl. No.: 13/196,958

(22) Filed: Aug. 3, 2011

(65) Prior Publication Data

US 2011/0289189 A1    Nov. 24, 2011

Related U.S. Application Data

(63) Continuation of application No. 12/272,360, filed on Nov. 17, 2008, now Pat. No. 8,015,263, which is a continuation of application No. 11/431,911, filed on May 10, 2006, now Pat. No. 7,472,175, which is a continuation of application No. 09/710,654, filed on Nov. 10, 2000, now Pat. No. 7,069,310.

(51) Int. Cl.

| G06F 15/173 | (2006.01) |
|---|---|
| G06F 15/16 | (2006.01) |
| G06F 15/177 | (2006.01) |
| G06F 17/30 | (2006.01) |
| G06F 11/30 | (2006.01) |
| G06F 11/34 | (2006.01) |

(52) U.S. Cl.
CPC ...... *G06F 17/30053* (2013.01); *G06F 11/3051* (2013.01); *G06F 11/3409* (2013.01); *G06F 11/3495* (2013.01); *G06F 11/3466* (2013.01)
USPC ............... 709/217; 709/203; 700/23; 700/88; 700/94; 715/704; 715/712

(58) Field of Classification Search
CPC .......... G06F 17/30053; G06F 11/3051; G06F 11/3495; G06F 2201/81; G06F 11/3409
USPC ........ 700/23, 88, 94; 709/200–203, 217–228; 715/704, 712
See application file for complete search history.

(56) References Cited

U.S. PATENT DOCUMENTS 5,237,157 A    8/1993 Kaplan
5,428,778 A    6/1995 Brookes (Continued)

OTHER PUBLICATIONS

Dan, A., et al.: Browsing and Retrieval Architecture for Hierarchical Multimedia Annotation, Multimedia Tools and App 7: pp. 83-101. (Dec. 31, 1998).

(Continued)

*Primary Examiner* — Haresh N Patel
(74) *Attorney, Agent, or Firm* — Fox Rothschild, LLP; Carol E. Thorstad Forsyth

(57) ABSTRACT

A method and apparatus for creating and posting media is provided. For example, the invention allows a user to quickly create, signal process, encode, and transfer media files to a server for storage, posting, distribution, and retrieval. Thus, media such as audio, video, display, photo, spreadsheet, Web Clips, and HTML pages can be combined into a media file for uploading to a server and accessed from listings posted at web sites. In accordance with embodiments, a user downloads and installs a plug-in at the user's client computer. The user then registers and logs onto the server to perform various tasks. For example, the user can create a combined audio and photo media file at the client computer, in accordance with server based control parameters received from the system server. The plug-in then allows the user to perform digital signal processing and encoding of the media file at the client computer. After the file is encoded, it may be uploaded to a server for storage, posting, distribution, and retrieval. A file management system provides copies and listings of the file to other servers and web sites as permitted. Thus, other user having access to the database or web site lists via other client computers may select the file for retrieval. In accordance with another aspect of the invention, an information management system provides file and file list rankings based upon selection or click through of files and file listings.

38 Claims, 14 Drawing Sheets

(56) References Cited

U.S. PATENT DOCUMENTS

| | | | |
|---|---|---|---|
| 5,487,132 A | 1/1996 | Cheng | |
| 5,539,635 A | 7/1996 | Larson, Jr. | |
| 5,590,282 A | 12/1996 | Clynes | |
| 5,592,511 A | 1/1997 | Schoen et al. | |
| 5,616,876 A | 4/1997 | Cluts | |
| 5,629,867 A | 5/1997 | Goldman | |
| 5,675,734 A | 10/1997 | Hair | |
| 5,715,444 A | 2/1998 | Danish et al. | |
| 5,721,897 A | 2/1998 | Rubinstein | |
| 5,726,909 A | 3/1998 | Krikorian | |
| 5,737,527 A | 4/1998 | Shiels et al. | |
| 5,768,578 A | 6/1998 | Kirk et al. | |
| 5,774,888 A | 6/1998 | Light | |
| 5,778,187 A | 7/1998 | Monteiro et al. | |
| 5,790,958 A | 8/1998 | McCoy et al. | |
| 5,809,246 A | 9/1998 | Goldman | |
| 5,819,160 A | 10/1998 | Foladare et al. | |
| 5,832,223 A | 11/1998 | Hara et al. | |
| 5,841,979 A | 11/1998 | Schulhof et al. | |
| 5,842,206 A | 11/1998 | Sotomayor | |
| 5,845,278 A | 12/1998 | Kirsch et al. | |
| 5,848,410 A | 12/1998 | Walls et al. | |
| 5,864,868 A | 1/1999 | Contois | |
| 5,870,739 A | 2/1999 | Davis, III et al. | |
| 5,873,079 A | 2/1999 | Davis, III et al. | |
| 5,892,909 A | 4/1999 | Grasso et al. | |
| 5,905,865 A | 5/1999 | Palmer et al. | |
| 5,905,981 A | 5/1999 | Lawler | |
| 5,913,204 A | 6/1999 | Kelly | |
| 5,913,215 A | 6/1999 | Rubinstein et al. | |
| 5,920,856 A | 7/1999 | Syeda-Mahmood | |
| 5,930,768 A | 7/1999 | Hooban | |
| 5,931,901 A | 8/1999 | Wolfe et al. | |
| 5,931,906 A | 8/1999 | Fidelibus, Jr. et al. | |
| 5,931,907 A | 8/1999 | Davies et al. | |
| 5,931,908 A | 8/1999 | Gerba et al. | |
| 5,937,407 A | 8/1999 | Sakata | |
| 5,943,669 A | 8/1999 | Numata | |
| 5,945,988 A | 8/1999 | Williams et al. | |
| 5,949,492 A | 9/1999 | Mankovitz | |
| 5,956,716 A | 9/1999 | Kenner et al. | |
| 5,959,945 A | 9/1999 | Kleiman | |
| 5,963,916 A | 10/1999 | Kaplan | |
| 5,963,965 A | 10/1999 | Vogel | |
| 5,970,489 A | 10/1999 | Jacobson et al. | |
| 5,977,964 A | 11/1999 | Williams et al. | |
| 5,983,005 A | 11/1999 | Monteiro et al. | |
| 6,263,313 B1 | 7/2001 | Milsted et al. | |
| 6,333,932 B1 | 12/2001 | Kobayasi et al. | |
| 6,374,260 B1 | 4/2002 | Hoffert et al. | |
| 6,591,247 B2 | 7/2003 | Stern | |
| 6,607,136 B1 | 8/2003 | Atsmon et al. | |
| 6,625,734 B1 | 9/2003 | Marvit et al. | |
| 6,657,116 B1 * | 12/2003 | Gunnerson | 84/615 |
| 6,675,205 B2 | 1/2004 | Meadway et al. | |
| 6,769,010 B1 | 7/2004 | Knapp et al. | |
| 6,871,107 B1 | 3/2005 | Townsend et al. | |
| 7,069,310 B1 * | 6/2006 | Bartholomew | 709/219 |
| 7,472,175 B2 * | 12/2008 | Bartholomew | 709/219 |
| 2002/0012897 A1 | 1/2002 | Tingley et al. | |
| 2002/0013897 A1 | 1/2002 | McTernan et al. | |
| 2002/0032783 A1 | 3/2002 | Tuatini | |
| 2004/0128697 A1 | 7/2004 | Wood et al. | |
| 2005/0021611 A1 | 1/2005 | Knapp et al. | |
| 2007/0011206 A1 | 1/2007 | Gupta et al. | |
| 2007/0177586 A1 | 8/2007 | Eyal et al. | |

OTHER PUBLICATIONS

Discover Music Template. [retrieved on Jan. 20, 2000]. Retrieved from the Internet <URL:http://www.discovermusic.com>; p. 1.
How Do I Create Talk Program. [retrieved on Sep. 28, 1999]. Retrieved from the Internet <URL:http://www.givemetalk.com>; p. 1.
Personal Video Webcasting. [retrieved on Feb. 6, 2000]. Retrieved from the Internet <URL:http://www.popcast.com>; p. 1.
Cyber Greetings and MessageBay to Offer Industry First Online Voice Greeting Cards. [retrieved on Oct. 10, 1999]. Retrieved from the Internet <URL:http://www.messagebay.com/press/090799.htm>; p. 1.
Destiny Internet Radio Broadcast Network. [retrieved on Jan. 10, 2000]. Retrieved from the Internet <URL:http://www.radiodestiny.com/broadcast/index.shtml>; p. 1.
Alvear, Jose; Next Audio Launches Radio Software Using Windows Media. [retrieved on Jun. 7, 2000]. Retrieved from the Internet <URL:http://www.streamingmedia.com:business-technology-content>: p. 1.
Welcome to Activate.net. [retrieved on Jun. 7, 2000]. Retrieved from the Internet <URL:http://www.activate.net>; p. 1.
VoizLetter Pro. [retrieved on Sep. 19, 2000]. Retrieved from the Internet <URL:http://www.mediaring.com/business/products/voizletterpro>; p. 1.
Gilster, Paul; Headline: Computers—The Web Connection to your Phone. [retrieved on Oct. 5, 2000]. Retrieved from the Internet <URL:http://www.internetspeech.com/06-05-00>; p. 1.
Message Bay, Create Your Own Personal Voice Greeting Card. [retrieved on Oct. 10, 1999]. Retrieved from the Internet <URL:http://www.messagebay.com/per1/mb_up.p1>; p. 1.
Press and Online Coverage. [retrieved on Feb. 1, 2000]. Retrieved from the Internet <URL:http://www.scala.com/users/quotes.asap>.
VoiceAge Corporation: Products Intro. [retrieved on May 23, 2001]. Retrieved from the Internet <URL:http://www.voiceage.com/news/newduo.htm>.
Audio content creation by Sppechradio.com Ltd., the Internet's leading audio content supplier. [retrieved on May 4, 2001]. Retrieved from the Internet <URL:http://www.positive-internet.com/~radio/>>.
Radical Communication—Radical Mall. [retrieved on May 4, 2001]. Retrieved from the Internet <URL:http://www.radicalmall.com/ws/products_mail.htm>.
Rich Streaming Media Software Tools from impatica.com. [retrieved on May 4, 2001]. Retrieved from the Internet <URL:http://www.impatica.com/home.html>.
Audio production for web pages. [retrieved on May 9, 2011]. Retrieved from the Internet <URL:http://www.audiowebpro.com/home.htm>.
One Voice Technologies, Leading the Voice Revolution. [retrieved on May 9, 2001]. Retrieved from the Internet <URL:http://www.onevoicetech.com>.
Tellme Networks, Tellme: the phone as it should be. [retrieved on May 9, 2001]. Retrieved from the Internet <URL:http://www.tellme.com>.
RadioAMP, The Power of Internet Audio. [retrieved on May 9, 2001]. Retrieved from the Internet <URL:http://www.radioamp.com/home_content.htm>.
Catsup, Unleasing the Power of IP Video. [retrieved on May 9, 2001]. Retrieved from the Internet <URL:http://www.catsup.net/corp/>.
Welcome to iHello, Speech-enabled applications for the mobile workforce. [retrieved on May 9, 2001]. Retrieved from the Internet <URL:http://www.ihello.com/speech/bizsol.asp?>.
Inspar—Home, Get your users creating streaming media with one button click! [retrieved on May 18, 2001]. Retrieved from the Internet <URL:http://www.inspar.com>.
About Telos, About Telos Systems. [retrieved on May 18, 2001]. Retrieved from the Internet <URL:http://www.telos-systems.com/about/about.htm>.
VocaLoca Inc.—Interactive Internet Broadcasting, providing true 2-way voice with the late . . . [retrieved on May 18, 2001]. Retrieved from the Internet <URL:http://www.vocaloca.com/indexb1.asp>.
ViewCast Online—Why ViewCast Online? The Digital Infrastructure. [retrieved on May 18, 2001]. Retrieved from the Internet <URL:http://www.viewcastonline.com/digitalinfrastructure.html>.

* cited by examiner

SYSTEM AND METHOD FOR CREATING AND POSTING MEDIA LISTS FOR PURPOSES OF SUBSEQUENT PLAYBACK

CROSS-REFERENCE TO RELATED APPLICATIONS

This application is a continuation of U.S. application Ser. No. 12/272,360 now U.S. Pat. No. 8,015,263, filed on Nov. 17, 2008, incorporated herein by reference, which is a continuation of U.S. application Ser. No. 11/431,911, now U.S. Pat. No. 7,472,175, filed on May 10, 2006, incorporated herein by reference, which is a continuation of U.S. application Ser. No. 09/710,654, now U.S. Pat. No. 7,069,310, filed on Nov. 10, 2000, which is also incorporated herein by reference.

BACKGROUND OF THE INVENTION

1. Field of the Invention

The present invention relates to the generation, transfer, and posting of media data in a computer network environment. More particularly, the invention relates to a client computer based system for creating, processing, encoding, and transferring media files for server based storage, posting, distribution, and retrieval.

2. Background Art

The development of computer technology, computer networks and the Internet has brought about a need for better ways to create, manage and disseminate files. The advancement of the Internet market has only increased this need and allowed providers of such services to maintain a viable business.

However, using current technology, the creation, preparation, management and dissemination of files (e.g., audio, visual media and/or presentation files) over the Internet is a tedious and inefficient process for the typical user. For instance, in order to disseminate an audio or visual presentation over the Internet, a number of steps are required. In addition, many parts of the process require specialized knowledge that many computer users do not have.

Using current systems, a user must first create or record an audio or video file live using a microphone and/or as a compilation of material that may include recordings made live as well as prerecorded offerings, including offerings from various potential inputs. All of these sources must be mixed together into a single recording with the volume and recording level controlled appropriately for each of the components. While programs exist for accomplishing this task, they require a degree of expertise on the part of the user.

In addition, recorded audio files can be digitally signal processed to optimize the quality of the sound using digital signal processing. However, such processing can require many steps including multi-band voice-optimized compression where compression reduces selected signal input (e.g. audio analog compression, not to be confused with data compression or encoding). Current systems also provide a way to optimize other types of files (e.g., video, audio, etc.) using digital or analog optimization techniques. For example, in order to create professional quality media files, these steps are generally not optional and thus failure to perform them put a web broadcaster at a competitive disadvantage as compared to one who does perform them.

Also, in order to use a file with certain software applications, the file is usually converted into a file format, such as Real Audio™, that can be replayed by that application. File conversion may also be required when the target application is a web browser. For instance, if the intended recipient is a web browser, the file is encoded into a format (e.g., WAV) that the web browser or a help application associated with the web browser is capable of playing. The programs that exist to accomplish this encoding require a degree of expertise on the part of the user.

Furthermore, media files uploaded to a server have little in the way of the capability to incorporate links to other web sites as part of the media file or presentation. Current systems, for example, lack a way for users to post parts of a presentation on different servers in order to utilize servers with various capabilities (e.g., RealServer™). If parts of the presentation are posted on different servers, the server must typically be provided with the capability to download all of the files associated with the presentation to the audience upon request. Once again, the steps require user intervention to accomplish tasks that require expertise. Furthermore, these tasks are time consuming and the process of editing or modifying a media file or presentation includes repeating the same steps as above.

Another limitation inherent in current systems is that once the user generates a media file, there is no simple mechanism for depositing the media files into a dynamic environment (e.g., a list that changes according to a set of criteria or behaviors established by the user). For example, users may send files they create to a server, but the prior art does not have a way for the posting user to sequence the files according to a series of dynamic attributes. Users cannot, for example, define the type of files that are to be placed on the server where the files that are on the server are associated with a list that changes according to criteria established by the user. Thus, there is a need for a system that accomplished these objectives by providing the user with a dynamic environment in which to upload files.

It is apparent that the current procedures to create, prepare, manage and disseminate media files and presentations over the Internet are lengthy and tedious, requiring a high level of knowledge of a number of computer programs for processing each step. The process is so tedious because each step typically requires the use of a different computer program and the user must take the output of one program and feed it into the next program.

Moreover, these tasks are currently performed as individual steps in separate programs on servers rather than on the user's computer. It would be more efficient for users to perform as many of these steps as possible on their own computers or clients, rather than attempt to perform the processing using software provided for them on a server.

For example, a user may have to upload a .WAV file to one server for signal processing and know how to operate the signal processing for that server. The user will then have to load the file to another server for encoding and know how to operate that program as well. After that, the user will have to load the completed file to a third server for distribution and must know how to use the system on that third server as well.

Therefore, there is a need for a simple, inexpensive way to create, process, encode, upload, post and distribute seamless media files and presentations while requiring minimal creator input, expertise, and time. Hence, a system is needed that runs on a user's local PC and is suitable for users who are not experts in various media recording, processing, encoding, transmitting, and server based software packages.

SUMMARY OF THE INVENTION

The present invention provides a method and apparatus for creating and posting media. Embodiments of the invention provide a convenient process for a user to quickly create, signal process, encode, and transfer media files to a server for storage, posting, distribution, and retrieval. For example, audio, video, display, photo, database, spreadsheet, voice messages, Web Clips, pictures, HTML pages, attachments, templates, and/or combinations of such data can be combined into a media file for uploading to a server and accessible from a listing posted at a web site.

In accordance with an embodiment of the present invention, a user accesses a system server to download a plug-in and register as a user. After downloading the plug-in, the plug-in is installed. The user may then log into the server where the user is given multiple options. For example, the user can "create" a media file using the create command. If the user selects the create command, server based control is initiated and the plug-in continues to record or receive media file at the plug-in, in accordance with the control parameters received from the system server.

For example, a user may record audio, video, photo, and/or display information options using the plug-in or other systems. For example, the plug-in may provide a user with a system for recording audio information using a PC base microphone and video input. Alternatively, a media file may be recorded using another method, or previously recorded and accessed by the plug-in.

Also, in accordance with another aspect of the invention, once the plug in has access to a media file, the plug-in performs digital signal processing upon that media file. In addition, the plug-in encodes the media file. After a file is encoded, it may be uploaded to a server for storage, posting, distribution, and retrieval from other client computers.

According to an embodiment of the invention, recording (e.g. setting levels, recording, playback, etc), signal processing of the generated file, RealAudio encoding, and upload to a server can be done with as few as 3 clicks (e.g. record/stop/upload).

Upon successful upload of a file, a file management system provides copies and listings of the file to other servers and web sites as approved by the creator of the file and the owner of the servers and/or site owners. For example, once a file is uploaded, the system then incorporates the file information into one or more web site lists and/or server based database. Once a file is incorporated into the databases, any user having access to a database or list, may select that file for retrieval or playback. Hence, the invention allows for media files to be stored to and accessed from one location (e.g. an Internet server) that is accessible from various locations (e.g. Internet clients via an Internet web site).

In accordance with another aspect of the invention, an information management system provides file and file list rankings based upon selection or click through of web page listing and/or desired files. Thus, for example, information relating to popular selections and lists can be tracked and recorded by the system in order to provide list and/or file ratings.

DETAILED DESCRIPTION

The present invention provides a method and apparatus for providing a system for creating and posting media. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention. Hereinafter, the term "system" is used to refer to a device and/or a method for performing a function. Furthermore, hereinafter, use of the term "media", "audio", "video", "data", or "data files" shall comprise various types of media including analog and digital audio, video, database, and display information or data.

Embodiments of the invention provide a convenient system for the user to create, signal process, encode, and transfer a media file (e.g. an audio file) to a server for storage, distribution, and retrieval from a posting. For example, a system can be implemented using a plug-in installed on a general purpose computer for creating RealAudio recordings with client-side processing, and automatically hosting those recordings on a computer network server and posting a reference to the recording on web site lists.

Embodiment of General Purpose Computer Environment

Figure 1:
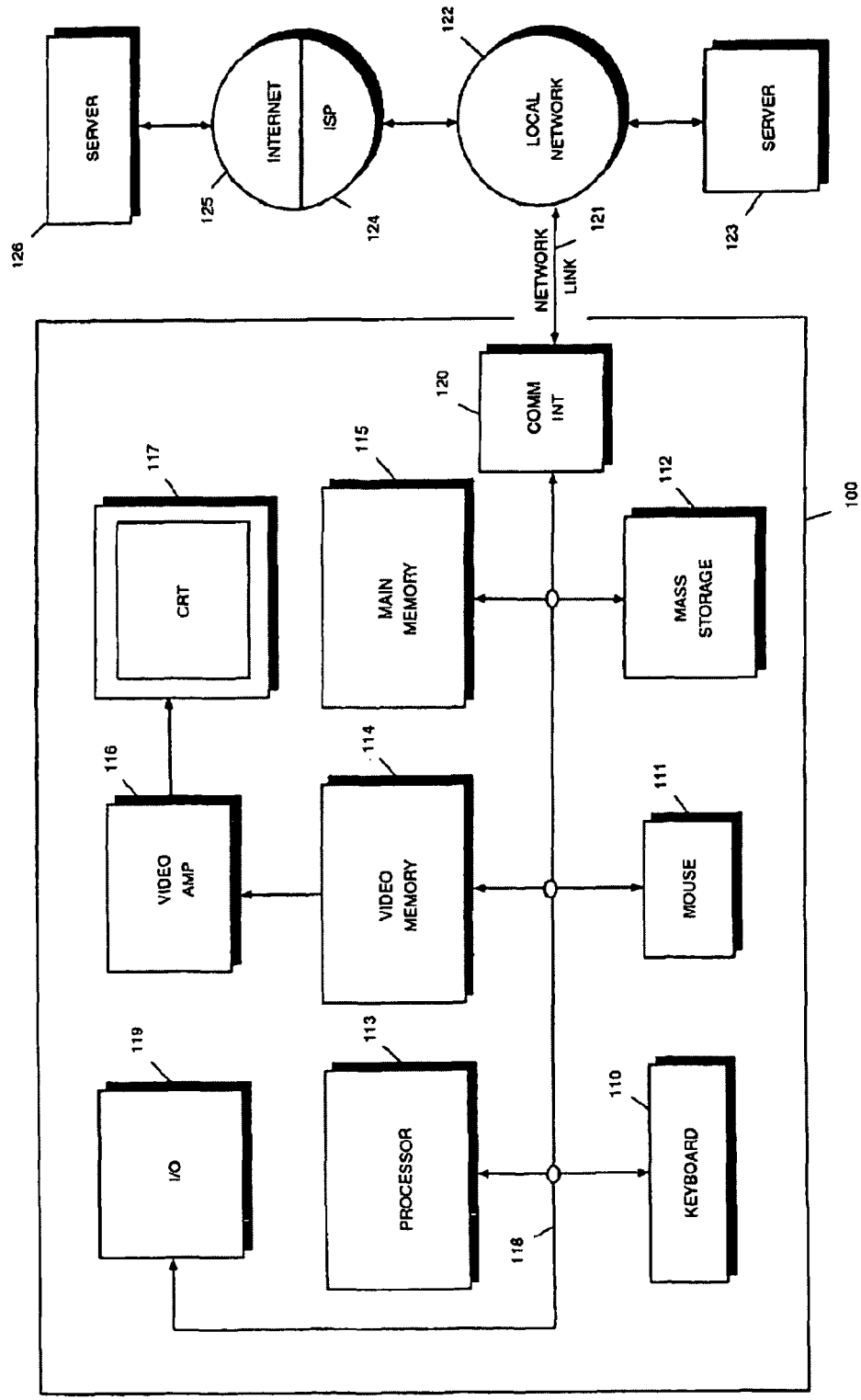
FIG. 1 is a block diagram of an example of a general purpose computer system that can be used for implementing the invention, in accordance with an embodiment of the invention.

FIG. 1 is a block diagram of an example of a general purpose computer system that can be used for implementing the invention, in accordance with an embodiment of the invention. For example, an embodiment of the invention can be implemented as computer software in the form of computer readable program code executed on a general purpose computer such as the computer 100 or as system comprising a general purpose computer 100. Hereinafter, the term "system" is used to refer to a device and/or a method for performing a function.

Referring to FIG. 1, a keyboard 110 and mouse 111 are coupled to a bi-directional system bus 118 (e.g., PCI, ISA or other similar architecture). The keyboard and mouse are for introducing user input to the computer system and communicating that user input to central processing unit (CPU) 113. Other suitable input devices may be used in addition to, or in place of, the mouse 111 and keyboard 110. I/O (input/output) unit 119 coupled to bi-directional system bus 118 represents possible output devices such as a printer or an A/V (audio/video) device.

Computer 100 includes video memory 114, main memory 115, mass storage 112, and communication interface 120. All these devices are coupled to a bi-directional system bus 118 along with keyboard 110, mouse 111 and CPU 113. The mass storage 112 may include both fixed and removable media, such as magnetic, optical or magnetic optical storage systems or any other available mass storage technology. The system bus 118 provides a means for addressing video memory 114 or main memory 115. The system bus 118 also provides a mechanism for the CPU to transferring data between and among the components, such as main memory 115, video memory 114 and mass storage 112.

In one embodiment of the invention, the CPU 113 is a microprocessor manufactured by Motorola, such as the 680X0 processor, an Intel Pentium III processor, or an UltraSPARC processor from Sun Microsystems. However, any other suitable processor or computer may be utilized. Video memory 114 is a dual-ported video random access memory. One port of the video memory 114 is coupled to video accelerator 116. The video accelerator device 116 is used to drive a CRT (cathode ray tube), and LCD (Liquid Crystal Display), or TFT (Thin-Film Transistor) monitor 117. The video accelerator 116 is well known in the art and may be implemented by any suitable apparatus. This circuitry converts pixel data stored in video memory 114 to a signal suitable for use by monitor 117. The monitor 117 is a type of monitor suitable for displaying graphic images.

The computer 100 may also include a communication interface 120 coupled to the system bus 118. The communication interface 120 provides a two-way data communication coupling via a network link 121 to a network 122. For example, if the communication interface 120 is a modem, the communication interface 120 provides a data communication connection to a corresponding type of telephone line, which comprises part of a network link 121. If the communication interface 120 is a Network Interface Card (NIC), communication interface 120 provides a data communication connection via a network link 121 to a compatible network. Physical network links can include Ethernet, wireless, fiber optic, and cable television type links. In any such implementation, communication interface 120 sends and receives electrical, electromagnetic or optical signals which carry digital data streams representing various types of information and media (e.g. audio and video data).

The network link 121 typically provides data communication through one or more networks to other data devices. For example, network link 121 may provide a connection through local network 122 to a host computer 123 or to data equipment operated by an Internet Service Provider (ISP) 124. ISP 124 in turn provides data communication services through the world wide packet data communication network now commonly referred to as the "Internet" 125. Hereinafter, "the Internet" will be used to refer to the Internet itself as well as other types of Intranets, networks, distributed servers, or client/server architectures.

Local network 122 and Internet 125 both use electrical, electromagnetic or optical signals which carry digital data streams to files. The signals through the various networks and the signals on network link 121 and through communication interface 120, which carry the digital data to and from computer 100, are exemplary forms of carrier waves for transporting the digital information.

The computer 100 can send messages and receive data, including program code, through the network(s), network link 121, and communication interface 120. In the Internet example, server 126 might transmit a requested code for an application program through Internet 125, ISP 124, local network 122 and communication interface 120.

The Internet/Client/Server

Computers and computer networks are used to exchange information, perform transactions, and provide entertainment in many fields. During these events, the exchange of data between computers typically occurs between a "server application" that provides information or services, and a "client application" or device that receives the provided information and services. Multiple server applications are sometimes available on a "system server" such as a single computer server that provides services for multiple clients. Alternatively, distributed server systems allow a single client to obtain services from applications residing on multiple servers. For example, in current distributed server systems, client applications or plug-ins are able to communicate with server applications executing on the same computer system or on another computer system accessible via a network, for instance via the Internet.

The Internet is a worldwide network of interconnected computers. An Internet client computer accesses a computer on the network via an Internet provider. An Internet provider is an organization that provides a client (computer) with access to the Internet (via analog telephone line or Integrated Services Digital Network line, for example). A client can, for example, read information from, download a file from, or send an electronic mail message to another computer/client using the Internet.

To retrieve a file or service on the Internet, a client must typically search for the file or service, make a connection to the computer on which the file or service is stored, and download the file or access the service. Each of these steps may involve a separate application and access to multiple, dissimilar computer systems (e.g. computer systems having operating different systems). The World Wide Web (WWW) was developed to provide a simpler, more uniform means for accessing information on the Internet.

The components of the WWW include browser software, network links, servers, and WWW protocols. The browser software, or browser, is a tool for displaying a user-friendly interface (i.e., front-end) that simplifies user access to content (information and services) on the WWW. Browsers use standard WWW protocols to access content on remote computers running WWW server processes. A browser allows a user to communicate a request to a WWW server without having to use the more obscure addressing scheme of the underlying Internet. A browser typically provides a graphical user interface (GUI) for displaying information and receiving input. Examples of browsers currently available include Netscape Navigator and Communicator, and Microsoft Internet Explorer.

WWW browsers and servers communicate over network links using standardized messages formats called protocols.

The most common modern protocol is the TCP/IP (Transmission Control Protocol/Internet Protocol) protocol suite. The protocols are based on the OSI (Open Systems Interconnect) seven-layered network communication model. WWW messages are primarily encoded using Hypertext Transport Protocol (HTTP). HTTP instantiates the (top) Application layer of the OSI model. Application layer protocols facilitate remote access and resource sharing and are supported by the reliable communications ensured by the lower layers of the communications model. Therefore HTTP simplifies remote access and resource sharing between clients and servers while providing reliable messaging on the WWW.

Information servers maintain the information on the WWW and are capable of processing client requests. HTTP has communication methods that allow clients to request data from a server and send information to the server.

To submit a request, the client browser contacts the HTTP server and transmits the request to the HTTP server. The request contains the communication method requested for the transaction (e.g., GET an object from the server or POST data to an object on the server). The HTTP server responds to the client by sending a status of the request and the requested information. The connection is then terminated between the client and the HTTP server.

A client request, therefore, consists of establishing a connection between the client and the HTTP server, performing the request, and terminating the connection. The HTTP server typically does not retain any information about the request after the connection has been terminated. That is, a client can make several requests of an HTTP server, but each individual request is treated independently of any other request.

WWW employs an addressing scheme that uniquely identifies Internet resources (e.g., HTTP server, file, or program) to clients and servers. This addressing scheme is called the Uniform Resource Locator (URL). A URL represents the Internet address of a resource on the WWW. The URL contains information about the protocol, Internet domain name and addressing port of the site on which the server is running. It also identifies the location of the resource in the file structure of the server.

HTTP provides a mechanism of associating a URL address with active text. A browser generally displays active text as underlined and color-coded. When activated (by a mouse click, for example) the active text causes the browser to send a client request for a resource to the server indicated in the text's associated URL address. This mechanism is called a hyperlink. Hyperlinks provide the ability to create links within a document to move directly to other information. A hyperlink can request information stored on the current server or information from a remote server.

If the client requests a file, the HTTP server locates the file and sends it to the client. An HTTP server also has the ability to delegate work to gateway programs. The Common Gateway Interface (CGI) specification defines a mechanism by which HTTP servers communicate with gateway programs. A gateway program is referenced using a URL. The HTTP server activates the program specified in the URL and uses CGI mechanisms to pass program data sent by the client to the gateway program. Data is passed from the server to the gateway program via command-line arguments, standard input, or environment variables. The gateway program processes the data and returns its response to the server using CGI (via standard output, for example). The server forwards the data to the client using the HTTP.

When a browser displays information to a user it is typically as pages or documents (referred to as "web pages"). The document encoding language used to define the format for display of a Web page is called Hypertext Markup Language (HTML). A sever sends a Web page to a client in HTML format. The browser program interprets the HTML and displays the Web page in a format based on the control tag information in the HTML.

Figure 2:
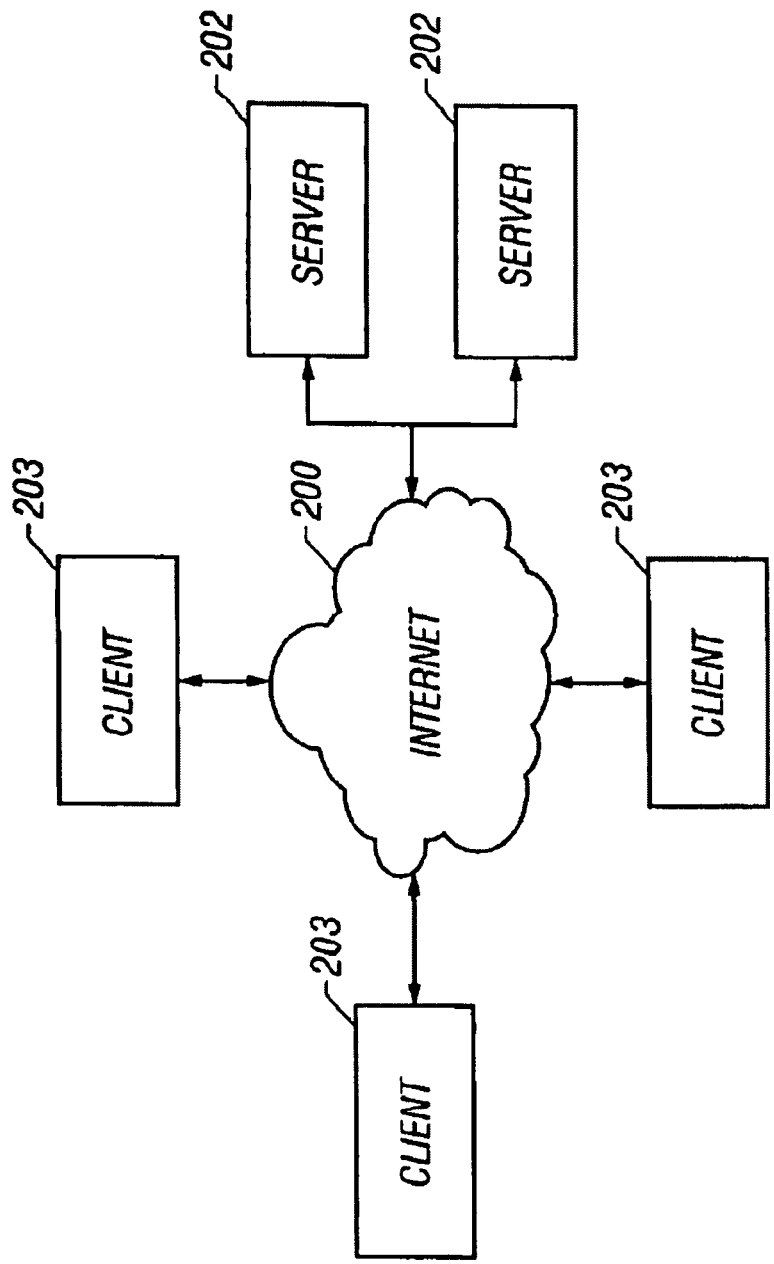
FIG. 2 is a block diagram of a general Internet or client/server environment that can be used for implementing the invention, in accordance with an embodiment of the present invention.

FIG. 2 is a block diagram of a general Internet or client/server environment that can be used for implementing the invention, in accordance with an embodiment of the present invention. For example, an embodiment of the invention can be implemented as computer software in the form of computer readable program code executed on a server computer such as the computer 202 illustrated in FIG. 2. Additionally, in an embodiment, the system can be implemented as a component of a network system such as a server computer 202 connected to the Internet 200 and accessible to client computers 203. In further embodiments, the invention can be implemented as is or on various other networks or network systems as appropriate.

Figure 3:
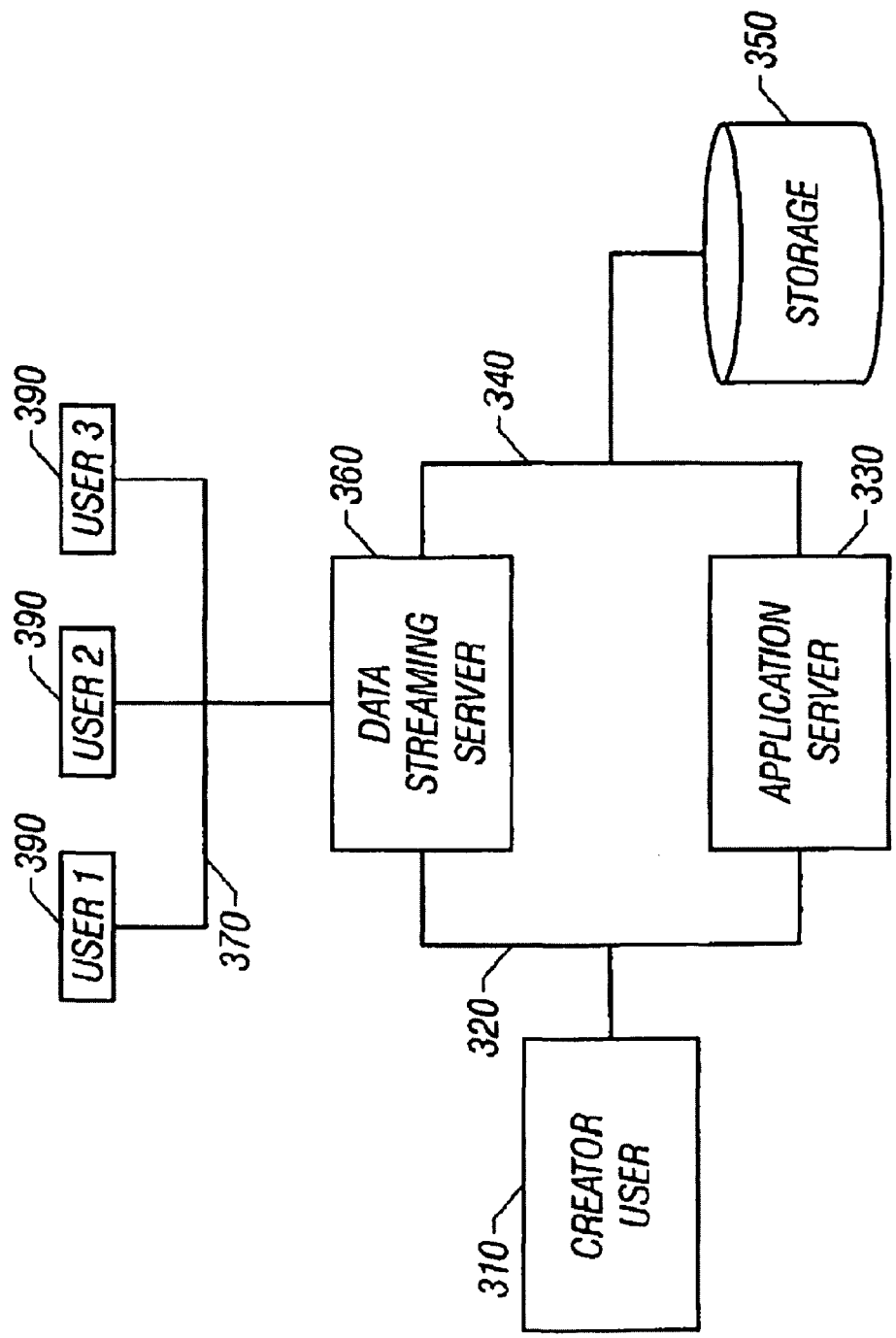
FIG. 3 is a block diagram of a method and apparatus for creating and posting media system implemented in an Internet or client/server environment, showing a client systems, servers, a data storage medium, and their related connections, in accordance with an embodiment of the present invention.

For example, FIG. 3 is a block diagram of a method and apparatus for creating and posting media system implemented in an Internet or client/server environment, showing a client systems, servers, a data storage medium, and their related connections, in accordance with an embodiment of the present invention. In a network environment, the invention can be implemented as computer software in the form of computer readable program code executed on a server computer such as 302 illustrated in FIG. 3. For instance, a "plug-in" can be downloaded to a client and used to interact with a server. Examples of plug-ins comprise helper applications which are invoked by a browser to handle files of a specific standard file format type, such as Multi-purpose Internet Mail Extensions (MIME). MIME is a developing standard (e.g. specified in RFC 1521) and MIME compliant mailers allow a user to encode an object and specify a viewer type for that object, and then mail the object to someone who has neither the proper decoder nor viewer on their own MIME-compliant system.

Referring to the embodiment shown in FIG. 3, the system can be implemented as components of a network system such as a computer client creator user 310 coupled via network connections 320 to a computer data streaming server 360 and an application server 330. In turn, servers 330 and 360 are coupled via network connections 340 to a data storage device 350. In addition, user client systems 390 (e.g. users 1 3) are coupled to the data streaming server 360 via network connection 370.

Thus, for instance, client PC's 310 and 390s could be connected to the Internet 320 and 370 in order to access server computers 360 and 330 which in turn provide access via a local network 340 to media file storage 350. In addition, the system servers, 360 and 330, provide a user with access to the database of media files 350 from a multitude of locations 390. Couplings, for example, via network connections 320, 340, and 370 may comprise or incorporate any web browser, such as Mosaic, Netscape Navigator, or Internet Explorer. Hence, the system servers may be accessed through an Internet web site and the computer network may be the Internet, however, various other appropriate bases for the system (e.g. servers) and computer networks may be used with the invention as appropriate.

According to an embodiment for example, the system comprises a client machine 310 (a general-purpose computer, PC, cell phone, etc.), a connecting apparatus allowing the client machine to communicate through communication means 302 (internet, LAN, WAN, wireless, etc.) with a server, where server means an electronic device able to communicate through communication lines. The servers are not limited to a single machine. For instance a server may include a cluster of machines connected to each other or not within one or more sub-networks 340. Server may also comprise necessary routers, repeaters, firewalls and all means that allow electronic devices to function and provide network functionality such as traffic load balancing, re-routing, failover and any other means that allow these devices to operate and implement any connection or system required functionality.

For example, servers may use software or hardware that enables them to transmit and receive encrypted data for enhanced communication security. In accordance with an embodiment of the present invention, some servers may be dedicated to communicating with the creator user, for clarity we refer to these servers as application servers. Other servers may be dedicated to other tasks, for example, involving information distribution to creator users 310 and/or other users 390.

According to embodiments, the apparatus comprises one or more data storage devices 350. Storage devices may comprise one or more computer hardware storage devices and/or various other means of data storage. Examples of storage devices include computer hard disks attached to servers and stand alone file systems enabled to communicate through any type of network connection (e.g. 340). For instance a storage device might be a general-purpose computer having a media file library or database and an association engine for associating the files with requests and Internet web site based listings of the files.

Thus, a creator and/or system user may keep a personal database of media files on a computer at home and/or in a database on a server. In such a case, an user of a PC having an audio and/or video mixing and recording system may record, signal process, encode, and upload the desired media to the server database for future use. Thus, a version of media from at any point in the recording, processing, encoding processes may be stored in the user's local computer, while the final processed version (e.g. edited, combined with other media, re-edited, condensed, and encoded file) is uploaded and stored on the server. The computer systems described above are for purposes of example only. An embodiment of the invention may be implemented in any type of computer system or programming or processing environment.

Figure 4:
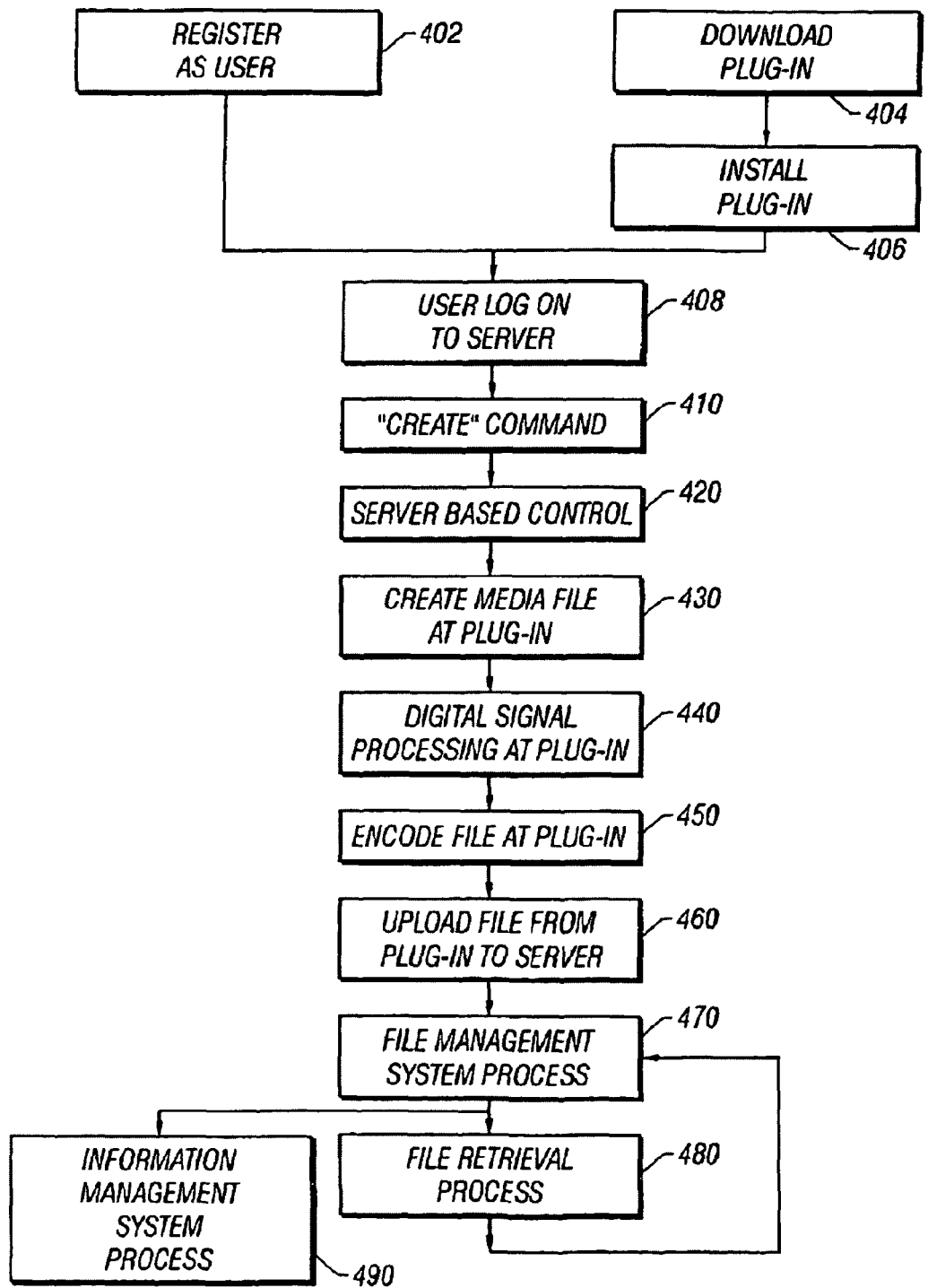
FIG. 4 is a flow diagram that illustrates the process used by the system to create and post media, in accordance with an embodiment of the present invention.

FIG. 4 is a flow diagram that illustrates the process used by the system to create and post media, in accordance with an embodiment of the present invention. A user is able to create locally and then transfer to and access from a network server (e.g. an Internet repository web site) various media files. For instance, the invention allows for media files to be stored to a network server and access via various web sites in order to provide creators and users of such files the ability to upload and download from various locations (e.g. network clients). Such a system defines a process where by a user's media files can be stored and listed to a personal web-site list location and/or listed to various other media file listings in order to provide a social "sharing" type environment for such media files. Some creators may even be considered "artists" for creating certain media file types, thus developing users who collect the entire inventory of that creator's recordings.

According to an embodiment, the user simply creates the media file, performs any desired signal processing, encodes the file at the user's local computer and then connects to the Service Website or local Website on his personal machine and uploads the file to the Website and selects which web sites to list the file with. Referring to FIG. 4, the flow describes a use of the system in general and may begin at various steps. A first step may be accessing the server and registering as a user 402. For example, the user registers by inputting user information such as user name, email address and provides a login name and password which are used to authenticate with the system each time the user starts a session. A potential registrant may also begin by first downloading the plug-in 404. For example, the user downloads a plug-in (e.g. in order to use the system user needs a browser helper application, or "plug-in"). Also, the helper application may be provided on the server and user may access it and download it on a load storage medium using an application able to transfer files across the network.

After downloading the plug-in, the plug-in is installed at step 406. During installation, the plug-in registers with the browser and generates a unique code that is stored in the plug-in computer's system registry for transmission to the server at a later time. Registration provides the user's browser with a code identifying the plug-in and linking the browser to the plug-in so that during network browsing, the browser will invoke the plug-in whenever the browser downloads a file having a specific MIME type from a server. Thus, registration of the plug-in with the browser enables the browser to find the plug-in and use it as a helper application.

According to an embodiment, once the plug in is installed and the user is registered, the user may log into the server 408. For example, the user logs in on the web site with the same user name and password provided during the registration process. After logon, the system may serve up a page that informs the user about the state of the system and gives configuration information or any other information the system is programmed to provide. After successful login, a user interface provides the user with multiple options, actions, and commands to choose from. For example, the user can create and upload a media file using the "create" command 410.

According to an embodiment, once the user selects the "create" command, the browser sends a request to the server for a link initiating the server based control process 420. Examples of server based control details and parameters are provided in reference to FIG. 7. Then, the plug-in continues creating media, in accordance with the server based control parameters.

According to an embodiment, after server based control is incorporated, the user may record or receive media file at the plug-in at step 430. Using the plug-in or another system, a user may record or access audio, video, photo, and/or media display control information and options. In addition the user may create any combination of such media as desired.

For example, the plug-in may provide a user with controls for recording audio information using a PC base system whereby a user may create and record an audio file at that time using a microphone, or from material that includes prior recordings. Examples of audio data input methods or systems comprise by microphone, computer network or Internet link, telephone link, cell or other wireless network links, infra-red link, file download, keyboard input, menu selection by keyboard or mouse, as well as various other appropriate systems. Prerecorded audio offerings include input from compact disks, phone lines, tape recorders, wireless transmission, MIDI music players, MP3, WAV and RA files. The plug in, allows all of these sources to be mixed together into a single recording with the volume and recording level controlled appropriately for each of the components. In addition the user may create any combination of such audio media as desired. For example, the user can mix these various input sources by selecting the "Custom" input type in the plug-in and then using a volume control panel to set the levels.

Similarly, for example, the plug-in may provide a user with controls for recording video, photo, presentation, or display information using a PC base system whereby a user may create and record a media file at that time using a camera, or from material that includes prior media recordings. Examples of video, photo, presentation, or display information data input methods or systems comprise by scanner, bar code reader, other dimensional indicia, data over computer network or Internet link, telephone link, cell or other wireless network links, infra-red link, file download, scanner, keyboard input, menu selection by keyboard or mouse, as well as various other appropriate systems. In addition the user may create any combination of such visual media as desired.

For instance, the user may select one of the above mentioned data input methods and/or types from a menu. Thus, a creator may select to enter photo media data from scanning a photo via a computer scanner. In the next step, the user inputs the scanned information into the system. Then, the creator may desire to attach audio to the scanned in photo using a microphone. Thus, the user selects audio input for the photo via microphone. The system now asks the user to input the audio information. After the audio data is input, the system associates the digital photo and audio data into a single media file in accordance with the server control parameters. As a result, the creator now has an audio and visual media file that can be used in a presentation. Although a system a specific example of inputting or recording is media files described above, a variety of appropriate input systems, fields, inputs, data types and input queries may be used in the invention at step 430. Embodiments of the invention also comprise the ability to do complex preprocessing of the media before sending it to the server. So, for example, the client plug-in performs complex and computationally intensive process such as the cropping and resizing of a photo. By having such intensive processing offloaded to the client, the system runs more efficiently.

In addition, embodiments of the invention provide for the client to provide the user with information regarding creation of improper media file data or formats, for instance when the recorded or created information is of an improper format or not in accordance with server based control parameters. For example, the creation process may require media processing by the client that can not be performed due to formatting problems or that the client does not have permission to upload to the server. Moreover, the client may be asking for processing of improper files, restricted files, or files that don't exist.

Once a media file is created or accessed by the plug-in, digital signal processing can be performed upon that media file 440. For example, recorded audio files can be digitally signal processed to optimize the quality of the sound for Internet transmission. Digital signal processing can require many steps including multi-band voice-optimized compression, where compression reduces selected signal input. Digital signal processing also includes sibilance, or hissing, reduction and presence boost for intelligibility, where presence refers to creating an impression that sound is being produced by something nearby. Further examples of details and parameters related to digital signal processing performed on media file data are provided in reference to FIG. 5.

According to an embodiment, after performing digital signal processing upon that media file, the plug-in encodes the media file. Encoding of the media file, at the plug-in, is performed at step 450. For example, the signal processing and encoding processes performed by the plug-in will reduce the size of the file data and encoded the reduced file data into a standard format. The plug-in also makes a connection with the system server in order to download the condensed standardized file to that server.

After a connection is made between the plug-in client and the server, the condensed encoded file may be uploaded to the server for storage, posting, distribution, and retrieval by other client computers. Referring to FIG. 4, the encoded file is uploaded, at step 460. According to an embodiment of the invention, recording (e.g. setting levels, recording, playback, etc), signal processing of the generated file, RealAudio encoding, and upload to a server can be done with as few as 3 clicks (e.g. record/stop/upload). Further examples of details and parameters related to uploading of media files are provided in reference to FIG. 6.

Upon successful upload of a file, the file management system provides copies and listings of the file as appropriate 470. For example, once a file is uploaded, the system then incorporates the file information into one or more lists and/or database. Further examples of details and parameters related to the file management system are provided in reference to FIG. 8.

Once a file is incorporated into the databases, any user having access to a database or list, may select that file for retrieval or playback 480. For example, a user could also opt to retrieve one of that a media file similar to the type of file the user wishes to create. In order to find such a file, the user could access web page listing of files advertised to be the same appropriate type. From such listing, the user then selects a file as desired. Further examples of details and parameters related to retrieval and playback are provided in reference to FIG. 9.

Upon selection of the web page listing and/or desired file, information relating to those selections can be tracked and recorded by the system in order to provide list and/or file ratings 490. Examples of details and parameters related to ratings are provided in reference to FIGS. 10a and 10b.

Thus, for example, the system improves upon prior systems because it accomplishes the automated collection of the data, combination of media, preprocessing of the media to make suitable for web presentation, encoding (for audio/video), and uploading in a unique and more efficient manner.

Figure 7A:
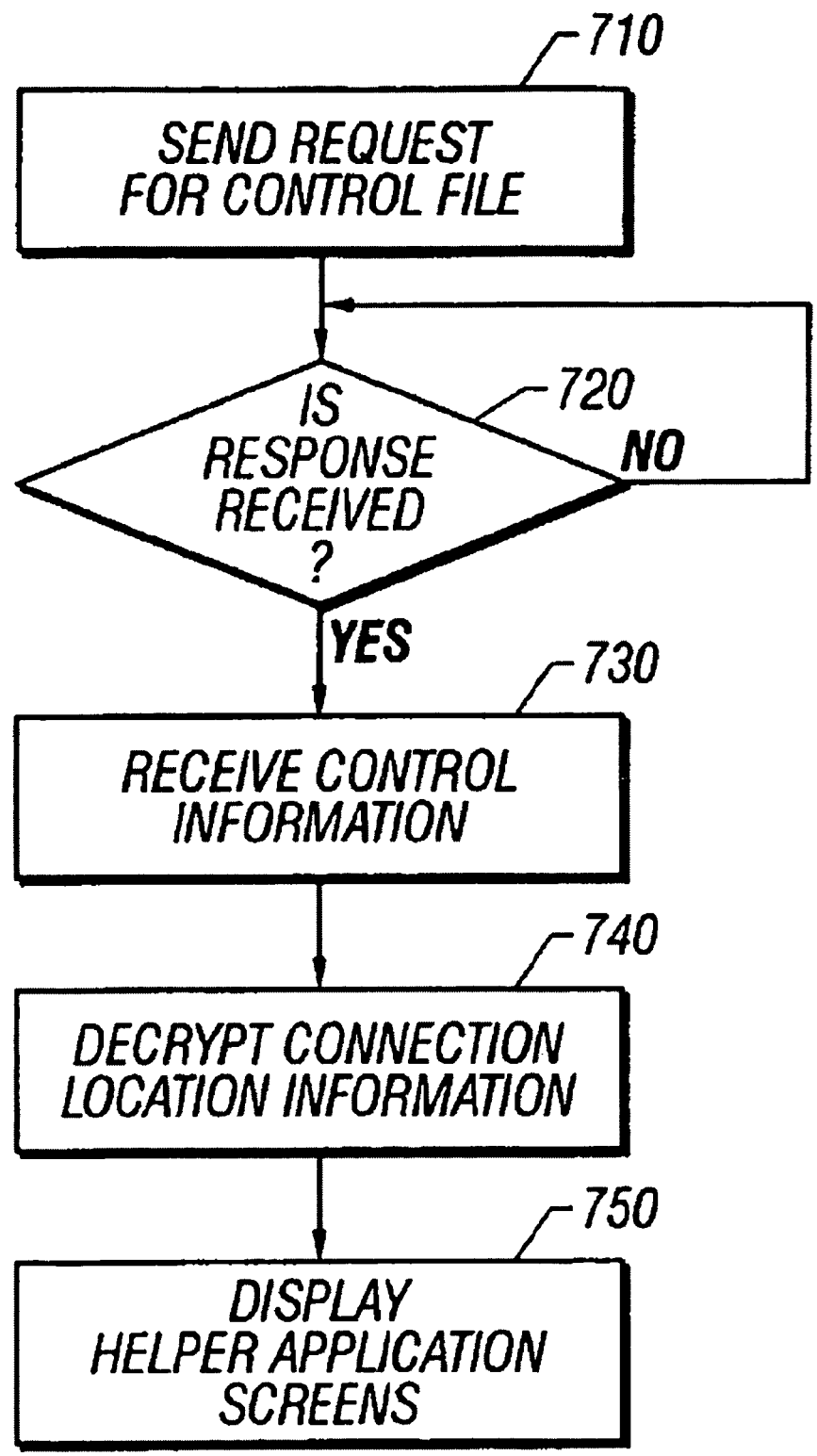
FIGS. 7a and 7b are flow diagrams that illustrate the process used by the system to provide server based control of the plug-in, in accordance with an embodiment of the present invention.
Figure 7B:
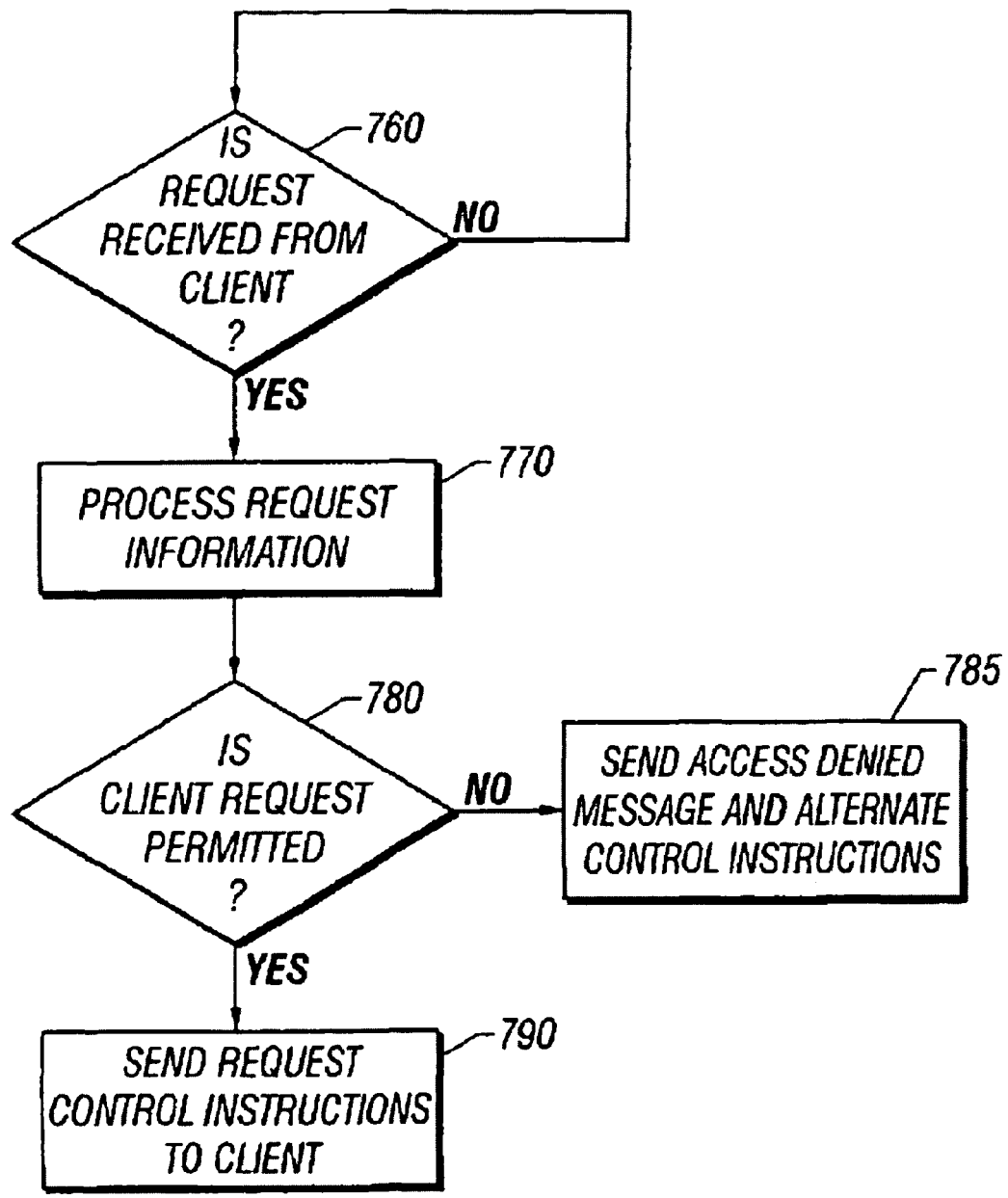

FIGS. 7a and 7b are flow diagrams that illustrate the process used by the system to provide server based control of the plug-in, in accordance with an embodiment of the present invention. Here, for example, the user initiates a new recording session by clicking on a specific browser hyperlink that causes the browser to request a command file from the system server. Receipt of such a command file will cause the browser to invoke the helper application plug-in. For example, once invoked, the plug-in may connects to the provider's server and requests a control file.

For example, FIG. 7a shows the process used by the system on the client side to request control file from the server, in accordance with an embodiment of the present invention. Once the plug-in is invoked, it connects to the provider's server and requests a control file 710 by sending a request to the application provider server. The plug-in then checks to see if a response from the server is received 720. Once a response from the server is received 730 the server proceeds by decrypting the encrypted string in order to obtain the connection location information for connection with the server 740. For example, the server's response may consist of an acknowledgement of the client plug-in request in the form of a text string and an encrypted string. Decryption of the string gives the plug in location information, such as a URL, so that the plug-in can communicate with the server in order to upload new media files. In addition, the plug-in displays plug-in or helper application screens 750. According to embodiments of the invention portions of the text string and/or encrypted string are used by the plug-in to provide the user with specific instructions and/or information in accordance with server based control parameters and other requirements and system parameters. For instance, once a connection is established in accordance with the connection information, the plug-in application proceeds by displaying a user interface enabling the user to record or load media files and/or upload media files onto the application server.

FIG. 7b is a flow diagram that illustrates the process used by the system on the server side to generate and provide a control file requested by the client application, in accordance with an embodiment of the present invention. Here, the server checks to see if a request from the client is received 760. Once a request from the client is received the server processes the request information 770. For example, the server may receive a request from the client for a control file through a hypertext transfer protocol (e.g. see step 710 of FIG. 7a). In an embodiment, the server records the information provided by the client and uses that information to generate a control file. Information contained in the request may be used to gather statistics information, perform authentication or carry out various server based information processing tasks. The server checks to see if the client request or requests are permitted 780. For example, the client request may not be permitted if the user's account is overdue or if the request is made by an unauthorized or unregistered copy of a plug-in. In such non-permitted instances, the server will send an access denied message to the client and may also send alternative control instructions so that the user can be informed as to the "what, why, and how" of the denial as well as potential cures or actions available 785.

If the client request is permitted at 780, the server then sends the requested control instructions to the client 790 (e.g. see steps 730 and 740 of FIG. 7a). For instance, the server may generate resource locator information (e.g. a URL string) and send to the client an encrypted version of this information in combination with other configuration information (e.g. a text string).

Figure 5:
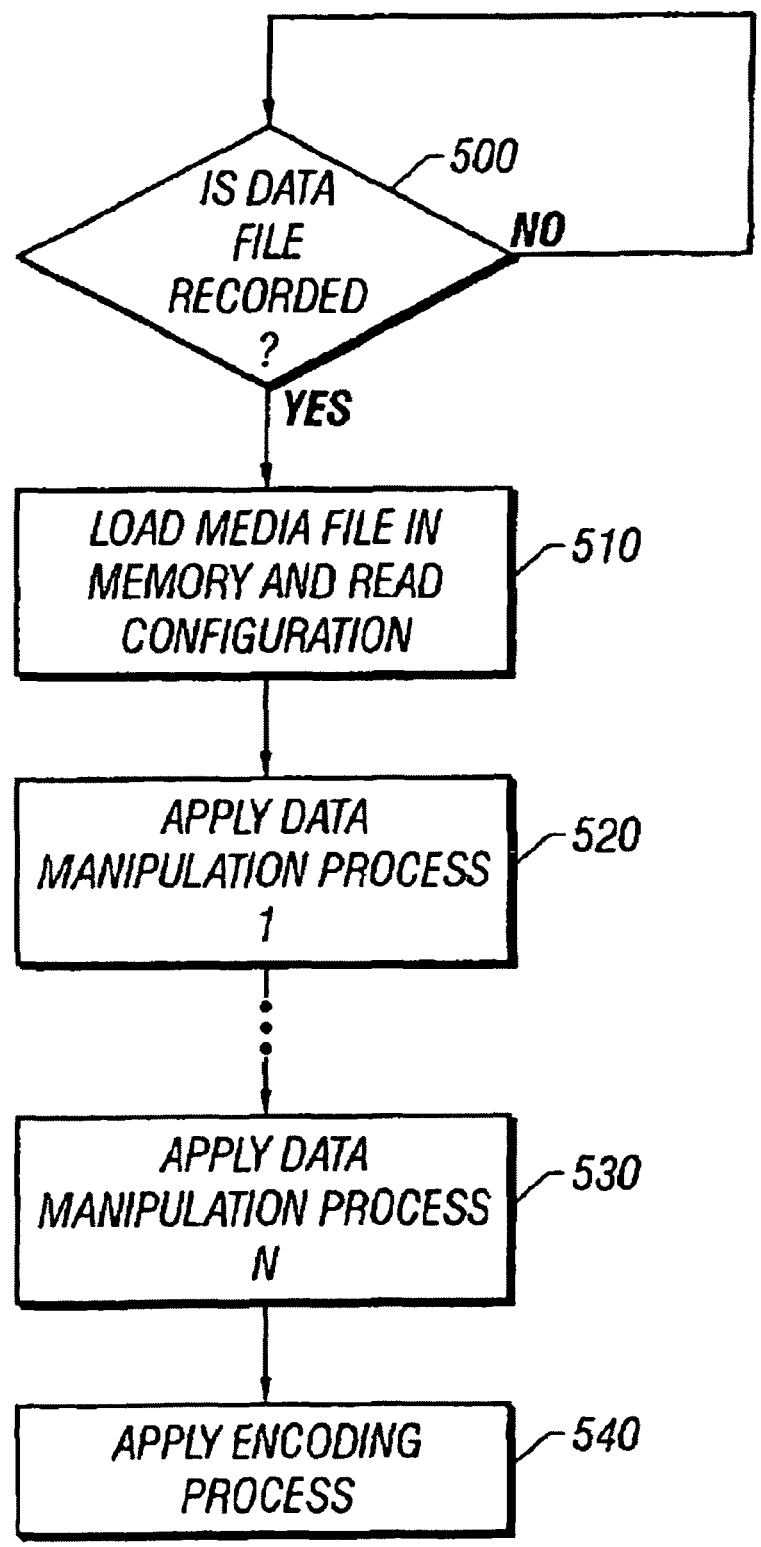
FIG. 5 is a flow diagram that illustrates the process used by the system to perform digital signal processing at the plug-in, in accordance with an embodiment of the present invention.

FIG. 5 is a flow diagram that illustrates the process used by the system to perform digital signal processing (DSP) at the plug-in, in accordance with an embodiment of the present invention. Here, the plug-in comprises a digital signal processing module that processes the recoded data to optimize the quality of the sound for transmission (e.g. transmission across a network or the Internet). The DSP module checks to see if a data file has been recorded 500, and if so loads the media (e.g. a file of an audio signal) into memory and reads configuration data supplied by the server 510 (e.g. during server based control described in FIGS. 7a and 7b above).

After the media is loaded into memory and the configuration data is read, the DSP module sequentially applies a data processing or manipulation process to the file 510. If necessary, the DSP continues to apply processing or manipulation steps to the file as required by the user, server based control, or other client, server, or system based parameter 520. Such processing could be, for example, to be any type of processing to make the media or data suitable for hosting. This could be digital signal processing for audio and video, or some other sort of processing for photos, such as cropping and resizing to fit a size specified by the control parameters.

The processing steps are aimed at, for example, improving the sound quality and removing components of the signal that are not perceivable by the human ear. Examples of processing methods include multiband voice-optimized compression, where compression reduces selected signal input. Digital signal processing also comprises sibilance, or hissing, reduction and presence boost for intelligibility, where presence refers to creating an impression that sound is being produced by something nearby. Bass boost can be used to create a feeling of warmth with male voices. Normalization for the maximum output level adjusts the level of a selection so that the highest peak is at the maximum recording level of the medium. Other digital signal processing features include a peak limiter that controls overload distortion, a smart expansion gate that reduces background noise by expanding signal input and a DC offset adjustment for cleaner encoding. A high frequency cutoff for reduced anti-aliasing effects is desirable, where aliasing refers to distortion caused by a sampler mis-recognizing a signal sent to it that is at a frequency higher than the highest frequency that can be recorded and reproduced properly at a particular sampling rate. Upon playback, the system will provide a signal at an incorrect frequency (called an alias frequency). While the proper digital signal processing is essential for the preparation of a high quality audio presentation, and computer programs exist to assist with the process, the various procedures can be difficult for those without the requisite experience.

Following digital signal processing, the system encodes the file by applying and encoding process 540. For instance, encoding involves converting or translating the file data into a standard format that can be distributed to other users and played by other media playing means.

Figure 6A:
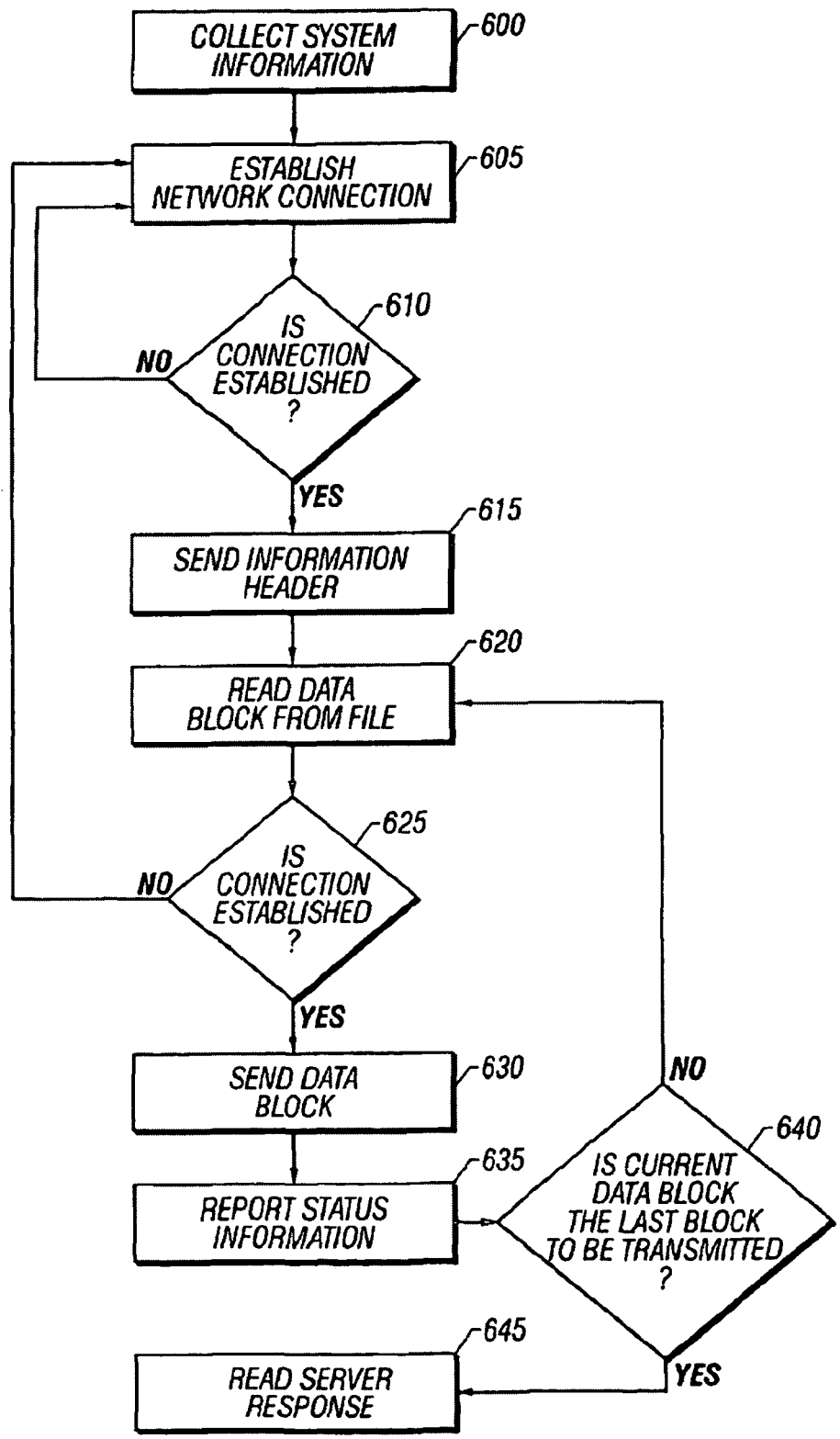
FIGS. 6a and 6b are flow diagrams that illustrate the process used by the system to upload or transfer a file to the server, in accordance with an embodiment of the present invention.
Figure 6B:
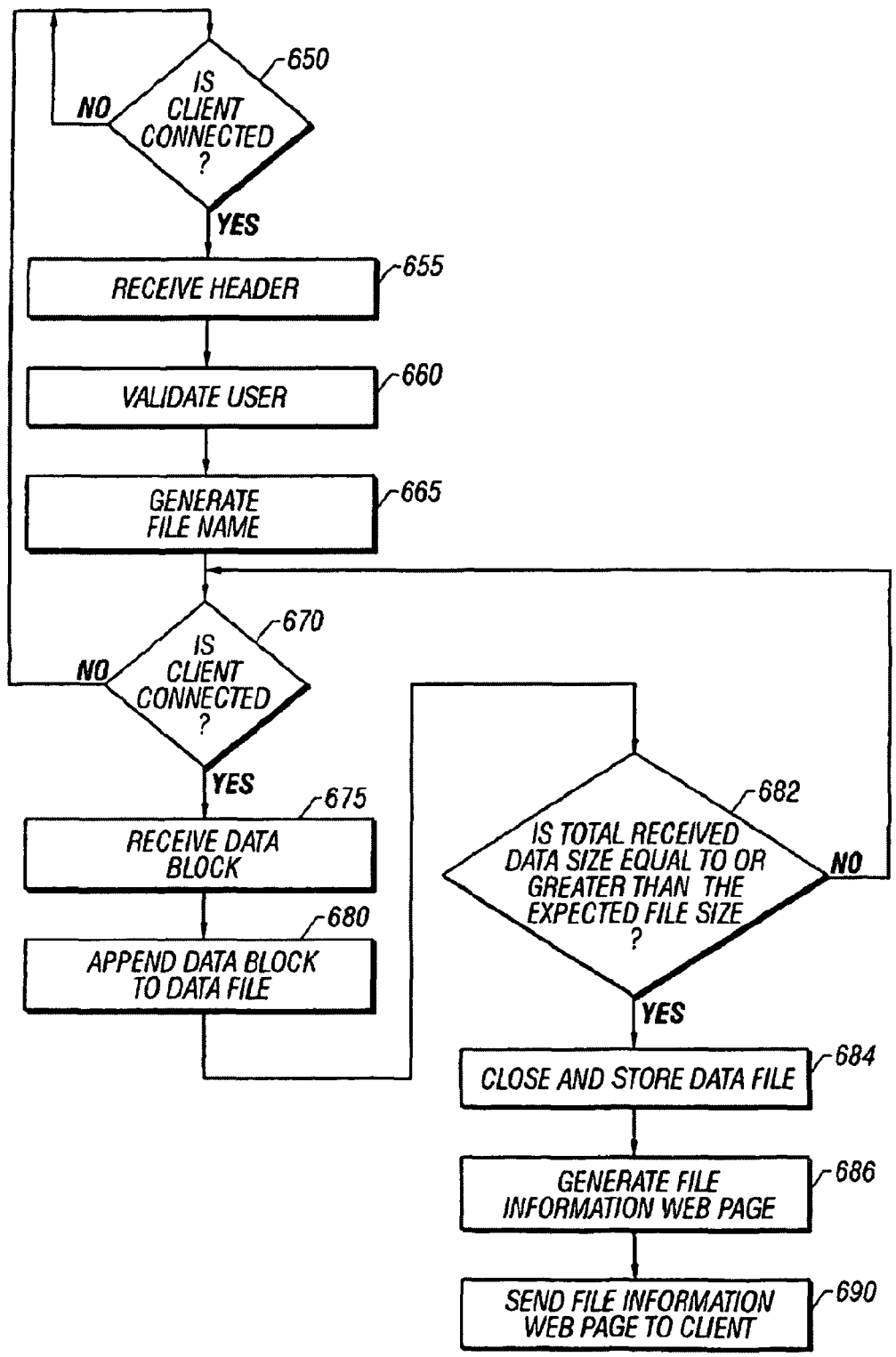

FIGS. 6a and 6b are flow diagrams that illustrate the process used by the system to upload or transfer a file to the server, in accordance with an embodiment of the present invention. For example, FIG. 6a describes the client application steps involved during the uploading of a data file. When the user issues an "upload" command through the user interface in order to upload a file for instance, the client application collects the system information necessary to perform data uploading 600. For instance, the client application obtains its unique identifier (e.g. the unique identifier generated during the installation process 406) from its execution environment's registry. The application may also obtain the resource locator information (e.g. URL) previously obtained from the application server during the launching of the plug-in.

Next, the plug-in opens or establishes a network connection with the application server 605 (e.g. using the URL obtained from the server in step 740). The plug-in tests whether the connection is successful 610, and if the connection is not successful returns to 605. When a connection is successfully established the application sends an information header to the server 615. The header may include, for example, the size of the file to be transferred as read by the plug-in. The plug-in then reads data blocks containing blocks of the file data 620. For instance, a block of file data may comprise a block of specific size. The plug-in checks the connection again at step 625. If the connection still exists, the plug-in then sends the data block to the server 630. Next the client reports the status of the transfer to the server 635. Embodiments also comprise the plug-in sending status of the transfer reports to the user through the user interface. The plug-in then checks to see if the data block currently transmitted (e.g. at 630 above) is the last block to be transmitted for the current file 640. If the block is not the last block, the plug-in returns to step 620 and reads data from another block. If the block is the last block for that file, the plug in reads the server response 645, and closes the client server connection. Examples of server responses comprise sending the client a page confirming that the upload was successfully completed, a page indicating that the upload was successfully canceled, a page indicating that the upload was not successfully. Further examples of server responses are provide in reference to FIG. 8.

FIG. 6b is a flow diagram that illustrates the process used by the system on the server side during the transfer of a data file from the client to the server, in accordance with an embodiment of the present invention. The server tests whether the connection with the client is successful 650. After a connection is successfully established the server receives the information header from the client 655. The header, for example, may include plug-in information such as the plug-in unique identifier, and information about the data file to be uploaded to the server (e.g. file size). The server validates the user at step 660, for instance, by comparing the ID received in the header received from the plug in with data in a database.

In addition, according to embodiments, the server may carry out a plurality of operations on the information received from the client application. For example, the server may check the plug-in's unique identifier to validate a user's rights to use a copy of the plug-in. The server obtains a unique identifier and uses the identifier to identify and generate a data file name 665. The server then opens a file where it will write the data received from the client. The server checks the connection again at step 670. If the connection still exists, the server waits to receive a data block 675.

Upon receipt of a data block, the server appends the data block information received from the client into a data file and stores the identifier newly obtained into a database 680. After each block of data received the server checks whether the total size of data received is equal to or has exceeded the total size of the file being uploaded 682 (e.g. total size of file being uploaded as previously communicated to the server by the client at step 655). If the total data file size has been reached or exceeded, the server closes the data file and stores the data 684.

Next the server generates a file information web page 686. Such a page may contain, for example, a page confirming that the upload was successfully completed, a page indicating that the upload was successfully canceled, a page indicating that the upload was not successfully. The server then sends the file information web page to the client 690 (e.g. see server responses 645 above). Further examples of file information web pages are provide in reference to FIG. 8.

According to an embodiment of the invention, once a file has been uploaded, a file management system provides processing so that the file may be stored, posted, and/or retrieved. For example, following the upload of a new data file, the system stores the new file on the storage device 350 under the file name newly generated in step 665. The server may also create a link to the new file at the file serving location. The link allows the media streaming server to access the content of the file and serve it to various users 390. The application server also stores file information in the database.

Figure 8:
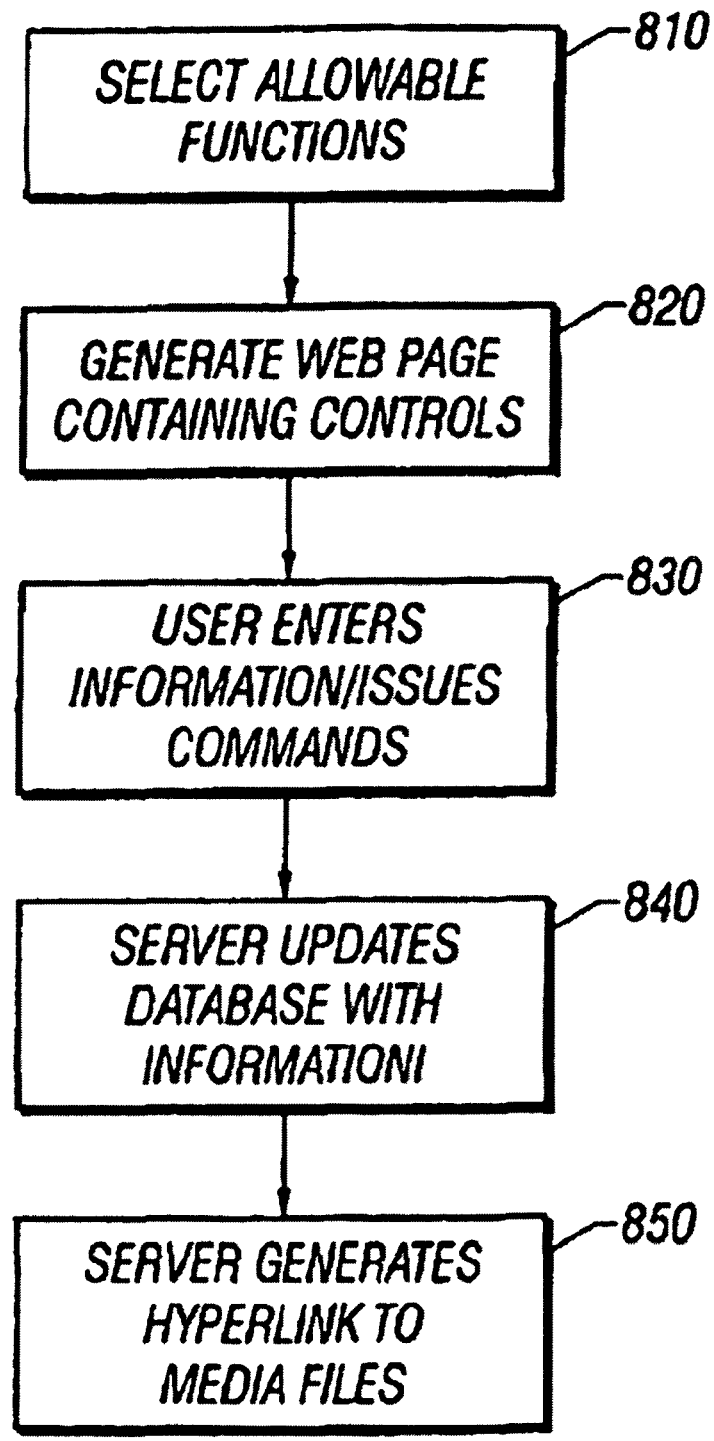
FIG. 8 is a flow diagram that illustrates the process used by the system to provide a file management system, in accordance with an embodiment of the present invention.

FIG. 8 is a flow diagram that illustrates the process used by the system to provide a file management system, in accordance with an embodiment of the present invention. Following the uploading of a new file, the server selects the allowable functions or controls for a user according to that user's profile 810. The invention contemplates providing one or more levels for access by one or more users in accordance with various permission and control parameters. Thus, each user's access may be characterized by a set of allowable functions and controls for that.

According to embodiments, after the allowable functions for a user are determined, the system generates a web page containing the graphical user interface controls and hyperlinks needed to access the server functionality associated with those allowable functions 820. Then, the user may choose to enter one or more types of information and/or issue one or more user commands 830. For example, the user may enter information describing the content of the file just uploaded. Other types or information may include attribute information. The server then updates any databases, file listings, web pages, file storage locations, and/or file or file listing libraries as necessary, as a result of, or as indicated in accordance with the user's command or information entered 840.

In one or more embodiments of the invention, the server is capable of generating one or more hyperlinks to media files 850. For example, the user is able to write a message and enter the email address of one or more correspondents. Upon the user issuing a command to the server, the system processes the message and adds media file hyperlink information into the message. The system may, for example, insert hyperlinks to the location of the media file into the message. The system then transmits messages with links to the creator user's specified media files, allowing the recipient of the message to easily access those media files. The links to the file locations are those created and made available on the media-streaming server.

The invention contemplates providing the user access to a variety of functionalities. In an embodiment of the present invention the user is able to input attributes associated with media files. The system uses such attributes to determine, for example, the user's preferred location for posting hyperlinks to the media files and/or the user's restricted locations. Other types of functionality include but not limited to posting a message onto a messaging system, or any other medium for communicating information.

Figure 9:
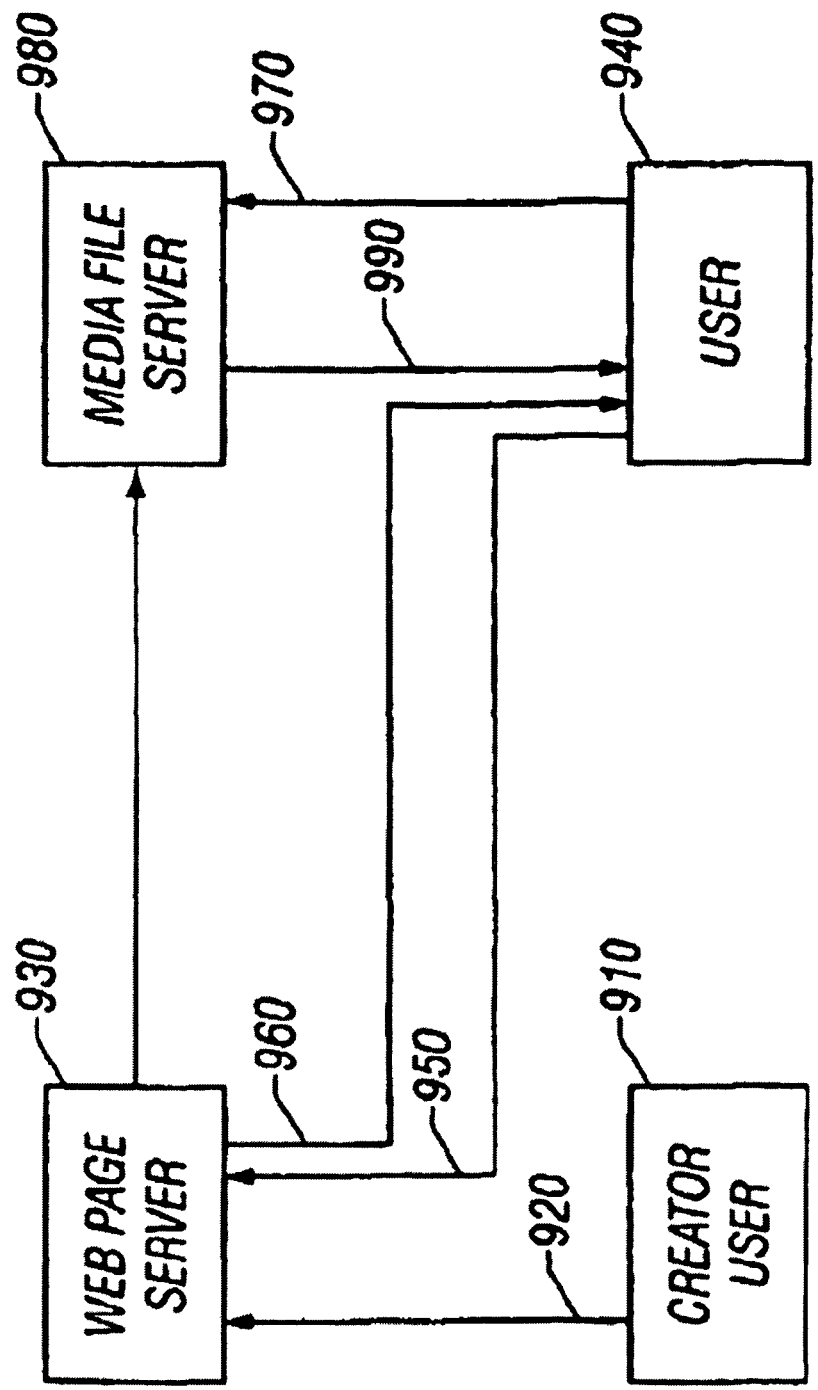
FIG. 9 is a block diagram that illustrates a method and apparatus for distributing media file content to users over a network of computers, in accordance with an embodiment of the present invention.

FIG. 9 is a block diagram that illustrates a method and apparatus for distributing media file content to users over a network of computers, in accordance with an embodiment of the present invention. For example, as described in FIG. 8, step 850, a creator user may obtain hyperlinks data to media files from the application server. Then, a creator user may include those hyperlinks a web page and uploads the web page 920 onto a server 930 capable of serving the web page. A creator user may also include one or more hyperlinks in any electronic message allowing any recipient equipped with web browsing capability to access the media files. Additionally, a creator user may also include one or more instructions in web pages and messages requesting list of hyperlinks to media files from the media file server.

According to embodiments, a user using a client computer 940 enabled with web browsing capability may access 950 a web server 930 and download a web page posted by a creator user 960. The web page may contain one or more hyperlinks to media files. The web page may also contain one or more instructions to download a list of hyperlinks to media files located on the media file server. Such instructions may contain one or more list identifiers, or one or more user identifiers. For example, the instructions can cause the browser to connect to the media file server 970 and request one or more media file lists. In response, the media file server may generate one or more lists of hyperlinks using information stored in the system database. Thus, a client browser may receive one or more lists or hyperlinks to media files 990. The hyperlinks are then displayed, enabling users to click through the links and download the media files.

Also, according to embodiments, a user may click through the hyperlinks displayed by the web-browsing device 940. Clicking on a hyperlink causes the browser to connect to the media file server and request a download of the media file. The media file server loads the requested media file into memory and start sending blocks of data to the client. Upon receiving data of a given media type, the client browser invokes a helper application (e.g. plug-in) that is designed to handle the specific media type. For example, if a user clicks to view a video clip, the browser may invoke a helper application able to play video clips. Likewise, if a user clicks through a hyperlink causing the browser to download an audio clip, the browser may invoke a helper application that plays the audio clip.

As described above (FIG. 8), the creator user is able to enter attributes that are associated with the media files. The creator user is also able to create lists of references to media files. Some lists contain only media file references, other lists may contain references to media files and references to other lists, or contain only references to other lists. The system combines any type of list with attributes associated to it to form a logical entity referred to as a "mediagram". Each mediagram is treated as an atomic unit that can be linked to directly via a pointer of some type (e.g. a resource locator) on a web page. In the example given above (FIG. 8), a user may insert a link to a mediagram in a message transmitted via the Internet. The receive user may click through the link to view a list of media files accessible only to that receiver user.

The system also utilizes information entities that describe relationships between mediagrams. These relationships may also possess properties that can be set or modified by the creator user or by the system. For example, a relationship may describe the number of times viewers viewing mediagram "A", which contains references to media files, clicked through to view a given file. In this example, the relationship is a number associating a mediagram "A" with mediagram "B", which contains a reference to a single media file and its attributes. As exemplified here, one can see that such a system facilitates information management for storing and posting media files on a network. Mediagrams can be represented as database entries or any other type of structure or container capable of holding data. The system propagates new additions to lists, or changes to attributes made by the creator user to all mediagrams automatically. The system, by way of using association entities, is able to provide some new properties such as rating, ranking, and/or popularity based on users interaction with the data.

Therefore, a list comprises a unit that can be managed by the creator-user (or any one else given authorization by the creator-user). Each list comprises a structure that takes on dynamic characteristics as a result of the input provided to the list. The creator-user can control the type of content data placed on the list and the users who have access to the list. Only certain type of users, for instance, may be allowed to utilize the list. Each list may comprise content (media data, mediagrams, links, other lists, etc.). In one embodiment of the invention, a list may contain or refer to other lists thereby creating a hierarchy of interrelated lists where each list has items comprising content data. A parent list, for example, may contain or refer to other child-lists that are related to the parent and possibly associated with one another. The contents (e.g., content data) or sequence of the list may change according to a set of criteria or behaviors (e.g., actions performed by users). The criteria or behaviors can be defined by the creator user although in some instances the criteria may be defined by others users. If a user selects an item in the list, that action (considered a "vote" for the item) may cause the selected item to ascend in the list because it is considered more popular. When an item is considered popular it is displayed in one embodiment of the invention in a more prevalent location than item that are not considered popular. Thus, items that are not popular descend in the list where items that are popular ascend. The invention contemplates many different activities that can be utilized to gauge popularity. For example, other actions may also cause the contents of the list to change. If, for instance a user places a link on a web page to a content item on the list that activity may be viewed as a strong statement that the content item on the list is worthwhile. In one embodiment of the invention, the criteria or behavior that moves the location of a content item on the list is defined by the creator-user. The invention contemplates that such criteria or behaviors may comprise any action by a user that expresses an interest or disinterest in the content item that was selected. Thus, the list comprises a dynamic environment that changes based on actions performed by users of the list.

Figure 10A:
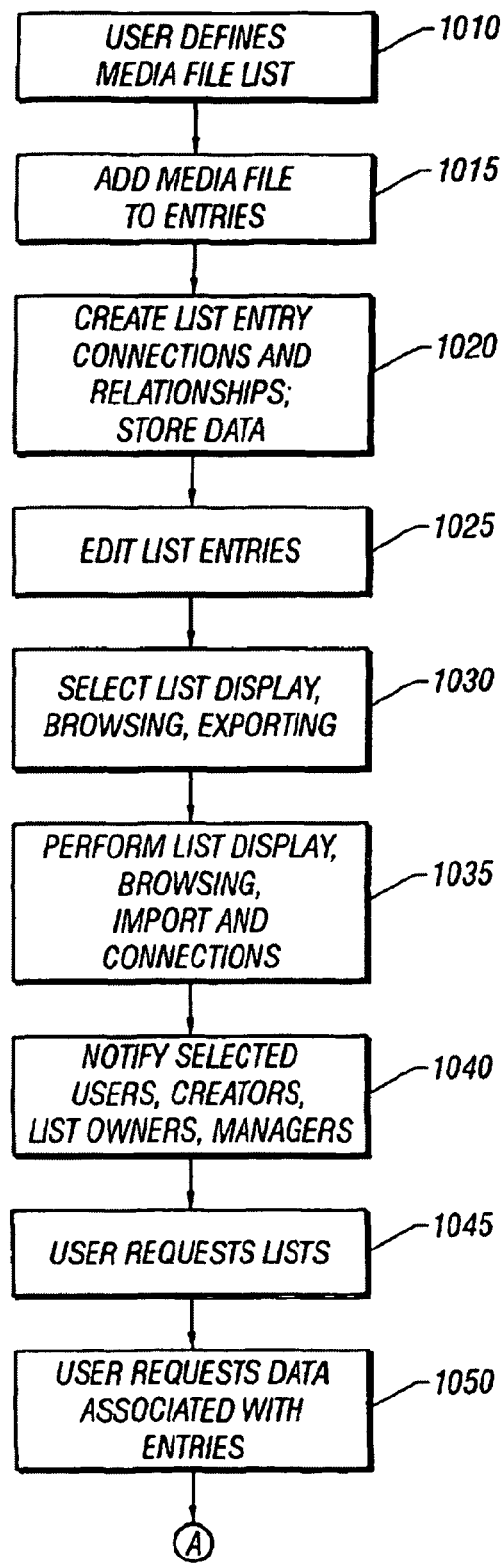
FIGS. 10a and 10b are flow diagrams that illustrate the process used by the system to provide an information management system for giving file and file list rankings, in accordance with an embodiment of the present invention.
Figure 10B:
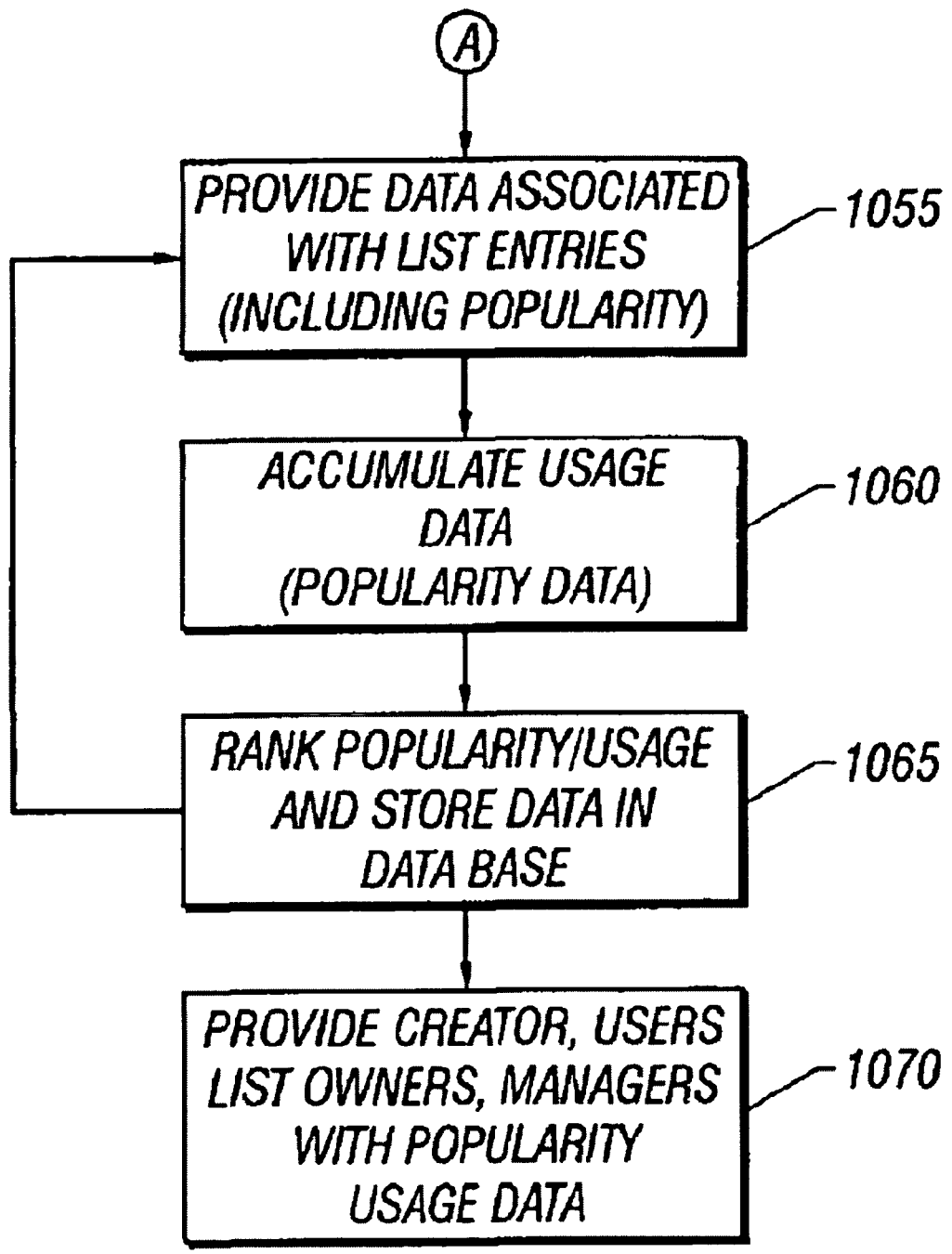

FIGS. 10a and 10b are flow diagrams that illustrate the process used to provide an information management system for giving file and file list rankings, in accordance with an embodiment of the present invention. The user defines the parameters of the media file lists at step 1010. The list definition may comprise list type, display parameters (e.g. including those for sequential display and navigation display), user access permissions, and automatic media file or mediagram management data (e.g. including archiving deadlines and deleting deadlines). List definition may also comprise access controls, editing mechanisms, and/or distribution mechanisms. The list type or type of list displayed can be selected by links from the home page and other locations within the system. For instance, a list display may be a multi-level tree structure, a navigation bar, and/or a directed graph. Additionally, the number of entries that each list contains may be determined by the creator of the list.

According to an embodiment, at step 1015, media files are associated with the list entries by a creator. As a result, media content is stored in database and file records. Media content may be stored in different databases or on different servers. Each piece of media content is treated as an atomic unit (e.g. a media file or mediagram) that can be directly linked to via a resource locator (e.g. URL) and served as a link through a page generated from a distribution list. Examples of media content comprise voice messages, Web Clips, pictures, HTML pages, attachments, templates, and imported lists. Templates may be used to collect and post media file or mediagram entries from a resource locator (e.g. URL) link. Imported lists comprise pointers to distribution lists and individual media files or mediagrams kept in another account. Moreover, the creator of the content can give permission to another media file or mediagram account holder to publish the content on other media file or mediagram accounts.

According to an embodiment, at step 1020, the system creates list entry connections and relationships and stores that data. For instance, connection data collected for the list entry is stored in the system databases. Also, associated rating, ranking, and/or popularity data for each media file, mediagram, web page, list, and/or list entry can be stored in the same and/or another database.

At step 1025, the list entries may be edited to add, delete or correct list entries. For instance, the creator of an entry and/or the owner of a list may have editing capability.

At step 1030, list display, browsing, exporting, and importing information functions may be selected. For example, a creator may select to export a list in order to sharing that list with other media file or mediagram accounts. The creator supplies the system with information on the user accounts the creator desires to share the list with. The information may include control over the whole list and/or separate overriding control for each individual media file or mediagram entry. Each media file or mediagram can be placed on multiple lists if desired to spread content around to various other lists. Access can be granted through static passwords, one-time passwords and digital certificates.

According to embodiments, a database is generated that contains information on all links between media files or mediagrams entries and lists. Whenever a creator edits lists, entries, media files or mediagrams, the changes are automatically made in the database and wherever the lists, entries and media files or mediagrams are stored. Also, a creator can request permission from another media file or mediagram account holder to publish content on the other account holders media file or mediagram account. If changes are made to media files or mediagrams that have been published on accounts belonging to others, a creator's changes will also be made in those accounts providing there is permission for placement of the items in those accounts.

By way of example, assume at step 1030 that an art site exists with stages for poetry, books, music, etc. A poet can request permission for posting of his poems on the poetry stage of the art site. Once permission is granted, his poem will appear on the poetry stage and any changes he subsequently makes to his poem will be automatically made there as well.

The system processes or performs list display, browsing, export, import and other connection relationship actions and information (e.g. including future actions depending on existing relationships) at step 1035. As mentioned above, embodiments provide tracking of associated rating, ranking, and/or popularity data for each media file, mediagram, web page, list, and/or list entry displayed or browsed by users and creators via selection, click through, activation, or various other appropriate systems.

At step 1040, the system notifies selected users, creators, list owners and managers about the existence and availability of lists. When a change is made to a list, media file or mediagram, notification can be sent by email or other delivery method (e.g. pagers and/or automated telephone calls). Thus, system users and creators have the opportunity to subscribe to or remove themselves from a subscription list.

According to an embodiment, at step 1045, a user may request lists from the system. The system allows for there to be lists of lists, thus lists may be multilevel or nested so that selection of an entry on one list causes a more detailed list for that entry to be displayed. The user may export the list if he has permission. The system may detect exportation of a list and keep a record of the exportation.

For example a creator could ask for permission to post to a second list owned by another by sending an email to the owner of the second list requesting authorization for the post, or for all posts from that creator (note that a system user can be a creator and/or list owner). Then, the owner of the second list could give authorization by checking a box in the email, by clicking a button, or other methods. Also, creators and/or list owners could join clubs or groups having certain distribution or listing rights.

According to an embodiment, a user may requests the data associated with a list entry, for example by clicking on that entry, at step 1050. After a user selects or requests a media file associated with a list entry, the system processes the user's request and provides the data associated with the list entry to the user and will make an entry in the associated ratings database increasing the rating for that media file 1055. Additionally, embodiments provide tracking of associated rating, ranking, and/or popularity data for each media file, mediagram, and/or list entry for which data is requested by users and creators via selection, click through, activation, or various other appropriate systems.

For example, the system will provide the media file selected to the computer or device the user has accessed the system server from and increases the rating for that media file. As noted earlier, media file data may comprise audio and visual data, attachments, documents and other items. If the media data file selected is owned by someone other than the list owner of the list the file is displayed on, then the file will only be retrieved if permission for listing by the list account holder and retrieval by the retrieving user has been obtained from the file owner account.

Embodiments provide tracking of associated rating, ranking, and/or popularity data for each media file, mediagram, and/or list entry that a creator or list owner desires. Thus, a user can be presented with a popularity ranking of a list or list entry in order to assist in selection (e.g. steps 1045 1055). Rating, ranking, and/or popularity data can be obtained by system comprising (1) counting the number of click-throughs from one list to another, (2) by counting the number of inclusions of a media file, mediagram, lists in another account holder's list, (3) by a count of the number of subscriptions to a list and (4) by various other appropriate systems or means that the creator, user, or system may desire. For example, ranking information may comprise a count of subscriptions to a list and/or a count for each of the entries of a subscribed to list. A creator or user may determine the type of information provided. For example, rankings can be displayed in chronological order, by popularity, title, creator, or as otherwise desired.

According to an embodiment, at step 1060, the system accumulates the tracking of associated rating, ranking, and/or popularity data described above. At step 1065, the system ranks the popularity or usage of the entry (e.g. rating, ranking, and/or popularity data) and stores this information in a database for access by the user at step 1055 or by others. For instance, according to an embodiment, at step 1070, the system provides detailed popularity or usage information to creators and others permitted by the creator to view such information such as system users, list owners, and managers. The creator determines the type of data provided and its availability.

Figure 11:
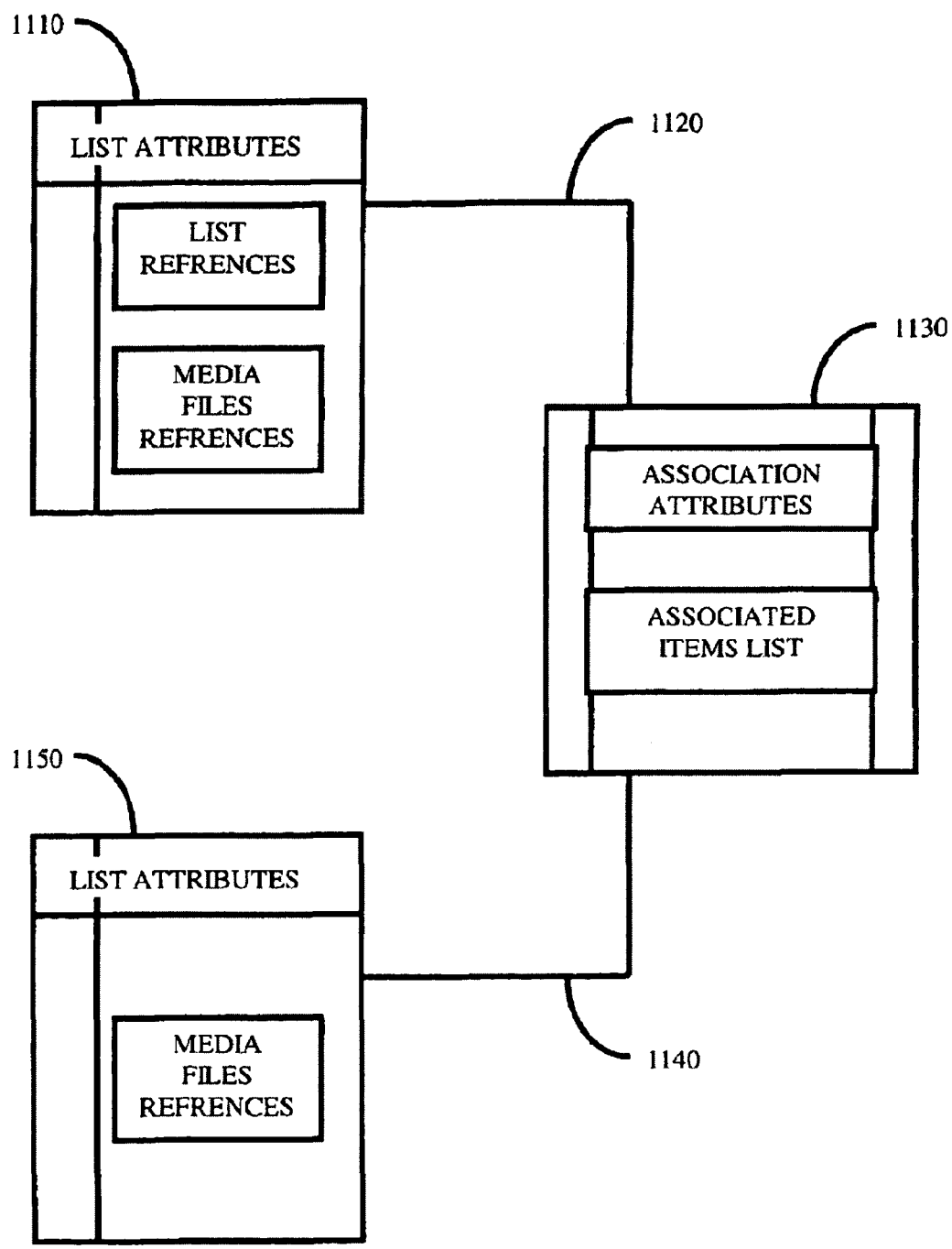
FIG. 11 is a block diagram that illustrates representation of information mediagrams used in the invention, in accordance with an embodiment of the present invention.

FIG. 11 is a block diagram that illustrates representation of information mediagrams used in the invention, in accordance with an embodiment of the present invention. A Mediagram is an atomic unit containing a list of attributes that characterize the mediagram, and lists of references to media files and/or reference to other mediagrams. For example, mediagram 1110 contains a list of attributes, a reference to a list and references to media files. Mediagram 1150 is similar to 1110 in that it has a list of attributes but is different in that it has only one list of media files. A third type of mediagram is 1130. In this example, this mediagram associates mediagrams 1110 and 1150. It stores association attributes and the list of associated elements. The association is represented by 1120 and 1140.

In addition to the lists and processes explained above, embodiments of the invention comprise additional sections to the existing media file or mediagram content collection system. For example, additional sections may be added to the content distribution lists which are used for assembling and managing the display and distribution of media file or mediagram content. Thus, the additional sections allow each mediagram to be assigned to an arbitrary number of content distribution lists and the resulting lists of mediagrams or nested content distribution lists (e.g. "sub-lists") are stored as database records. Such distribution lists fall into 3 categories.

The first category is navigation pages. For example, navigation pages may use a three frame display (or simulated frames, depending on implementation), a header frame, a navigation frame and a content frame. The title of the mediagram or sub-list is displayed in the navigation frame and the content of the currently selected list entry in a content frame. The second category is Display Pages. For example, there is a single display area (no frames) with the header at the top followed by the display content of each mediagram in the list.

The third category is single entry pages. For example, this type is for when the user wants to distribute a single mediagram using the distribution list processing features (such as sharing lists with other accounts). In this case there is no header, only the display content for the single mediagram in the list is shown.

In additional embodiments, the distribution lists may have a list definition that gives list types including navigation pages, display pages, and single entry pages. Also, the distribution list may include a list display header (e.g. a header specified in same manager as mediagrams). In addition, the distribution list exporting may include control of access for all entries on the list. For example, for this reason, users will have to use single entry lists to have granular distribution control over individual mediagrams. List exporting may specify a distribution list for user to access as a click-through point from the exported list. Here, the purpose is to provide an entry point from an aggregated collection of content to content at this specific account. Thus, it fits in with the calculation of relative popularity. Moreover, the list exporting may grant access via manual evaluation, or various other techniques as appropriate.

In additional embodiments, the distribution lists may have a popularity ranking where the relative rank of popularity is based on the items in each list. For example, each mediagram and distribution list contains a numeric count of popularity. The rank is the relative popularity within each list. Popularity count values have no absolute meaning and may be concealed from user in final implementation. For example, if a list contains an entry that is extremely popular in some other list, but is unpopular on this list, the system may display the overall rating (including counts both lists), or the system may just rank relative to this particular list (e.g. according to click-throughs from this list only), or some combination. Additional embodiment contemplate popularity ranking by various other empirical and statistical methods.

Additional embodiments of the invention comprise content automation lists (e.g. content "Wizards" or "Templates"). These types of lists or wizards contain sequential steps that guide the user through the generation of mediagram content and the assembly of that content into the distribution lists. An example of an automation lists may include various features and information, such as a list definition having user accessed permissions (e.g. passwords) and automation step list. Automation step lists can include lists of each step to generate the mediagram content and place it in the appropriate distribution list where each entry contains a mediagram type to collect or a Distribution List where the content will be deposited. Automation step lists can also include default values for each field of the mediagram or list that are hardcoded into the step, or inserted based on form entries requested from the user. Such version may not have programming, but that could be added (such as VB code to handle more complex steps). Moreover, the account user can use the automation lists to simplify routine production processes. Finally, just like all other lists in the system, the account owner has the ability to link the automation list into another HTML page. Traversing this link will invoke the steps of the automation list. This is extremely important, as it provides for the automated collection and distribution from any page on the Internet that contains the link.

Additional embodiments of the invention comprise content packaging technology. For example, packed into a single file would be all of the files of a web page or set of pages. This single file could then be downloaded and viewed offline, and passed around intact, thus, allowing for an application where the distribution lists provide a mechanism for specifying what would be packed into one of the self-contained single files. The distribution list could also provide the underlying control structures for managing access and distribution to the single files. For example, if the content creator chose, a distribution list could be packed into a single file and downloaded to users, instead of being served in real time. If the user volunteers, their computer could act as a distribution point for the file, forming the basis for a peer-to-peer content distribution system. Additional embodiments of the invention comprise combining the elements and processes above to create a system for distributing original content by tapping into the spare bandwidth of the volunteer computers to distribute multimedia websites for a much lower cost than using a centralized system.

The invention also contemplates embodiments wherein the media comprises audio, video, display, photo, spread sheet, database, octal, programming, object oriented programming, message, email, attachment, word processing, textual, figure, drawing, network browser, network resource locator, network link, web site, web page, web content, program application, program plug-in, java page, java programming, object oriented programming, and/or any combination thereof.

Additionally, the invention contemplates embodiments wherein the media comprises various functionalities applicable to the desired media as set forth above. For example, an embodiment contemplates sound, video, icons, active icon, text scrolling, hotlink, embedded link, and other media functionality as appropriate. Additionally, once the presentation has been finalized, the creator would like to be able to transmit either the presentation or voice messages to selected members of an audience by e-mail. Finally, a creating user might wish to use these files to provide programming material for an Internet Radio Station.

Similarly, the invention contemplates application to various other appropriate telecommunications, data communications, and signal transmission systems and environments where a plug-in at one location or device can be used to record information to be uplinked to another location or device using other networks such as wireless networks, satellite networks, RF networks, coax cable, fiber optic cable, satellite links, cell links, radio waves, etc.

The computer systems, networks, programming, and processes described above are for purposes of example only. An embodiment of the invention may be implemented in any type of computer system or programming or processing environment. Furthermore, any and all of the above mentioned methods, products, and/or embodiments may be used separately or integrated with any and/or all of the others.

Thus, a method, apparatus, and system for creating and posting media has been described. Although the present invention has been described in detail with reference to particular embodiments, persons possessing ordinary skill in the art to which this invention pertains will appreciate that various modifications and enhancements may be made without departing from the spirit and scope of the claims that follow. Hence, particular embodiments described herein are illustrative only and should not limit the present invention thereby. The invention is defined by the claims and their full scope of equivalents.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the following claims.

I claim:

1. A system, comprising:
    a first computer configured to
        receive and store media content comprising media data for distribution to at least one second computer remote from said first computer,
        create a plurality of dynamic lists, each comprising a plurality of first list items which are arranged in a dynamically modifiable order, said dynamically modifiable order being changeable in response to an addition of a new list item to said plurality of dynamic lists,
        add at least one first reference to said media content to a first dynamic list of said plurality of dynamic lists, and
        enable access to said first dynamic list by at least one first user of said second computer in accordance with sharing information provided by a second user of said first computer;
    wherein at least one of said plurality of dynamic lists comprises a hierarchy of said plurality of dynamic lists that are interrelated, said hierarchy being navigable by said second user
    wherein said second computer is configured to
        receive at least one dynamic list of said plurality of dynamic lists from said first computer,
        display said received dynamic list to said first user,
        receive a user input selecting a list item of said received dynamic list containing a reference to said media data,
        download said media data in response to the reception of said user input; and
    wherein said second computer is further configured to
        receive a notification that said media data has been changed,
        download said media data which has been changed in response to the reception of said notification, and
        notify said first user that said media data which has been changed has been downloaded.

2. The system according to claim 1, wherein said media data comprises at least one of audio data, video data, photographic data, textual data, database data, web content data, and programming code data.

3. The system according to claim 1, wherein at least one of said plurality of dynamic lists comprises content obtained by said first computer based on pre-defined criteria.

4. The system according to claim 3, wherein said pre-defined criteria comprises at least one of a user behavior criteria, a category criteria, and a ranking criteria.

5. The system according to claim 3, wherein said pre-defined criteria comprises at least one of a user behavior criteria, a category criteria, and a ranking criteria.

6. The system according to claim 1, wherein at least a second dynamic list of said plurality of dynamic lists comprises a mediagram.

7. The system according to claim 6, wherein said first computer is further configured to receive a changed version of said second dynamic list and store said changed version of said second dynamic list in a data store thereof.

8. The system according to claim 1, wherein said first computer is further configured to communicate media data parameters to said second computer, said media data parameters indicating data formats that are supported by said first computer.

9. The system according to claim 1, wherein said first computer is further configured to communicate information to said second computer for enabling said second computer to obtain information specifying at least one media attribute associated with said media data, and obtain information requesting that said media content be shared with at least one other device.

10. The system according to claim 1, wherein said first computer is further configured to
    compute popularity data for said media content based on user behavior, and
    create a second dynamic list comprising at least one second reference to said media content and a ranking of said media content based on said popularity data.

11. The system according to claim 1, wherein said first computer is further configured to
    receive authorization from said first user to reference an import list comprising a plurality of second list items in a second dynamic list, and
    generate said second dynamic list containing at least said reference to said import list and being automatically modifiable in response to changes in said import list.

12. The system according to claim 11, wherein said first computer is further configured to add at least one of a plurality of second list items to said second dynamic list.

13. The system according to claim 11, wherein said reference to said import list is added to said second dynamic list in response to a selection of said reference to said import list by said second user.

14. The system according to claim 1, wherein said first computer is further configured to
    generate a distribution list comprising export control data and a reference to at least one dynamic list of said plurality of dynamic lists that are to be exported to an external device,
    export said dynamic list referenced in said distribution list, and
    add a reference to said exported dynamic list to a second dynamic list in accordance with said export control data, said second dynamic list being dynamically modifiable in response to changes in said exported dynamic list.

15. The system according to claim 1, wherein at least one item of said plurality of first list items comprises a reference to a hierarchical list.

16. The system according to claim 15, wherein a reference to said media data is retrievable by traversing said hierarchical list.

17. A system, comprising:
    a first computer configured to
        receive and store media content comprising media data for distribution to at least one second computer remote from said first computer,
        create a plurality of dynamic lists, each comprising a plurality of first list items which are arranged in a dynamically modifiable order, said dynamically modifiable order being changeable in response to an addition of a new list item to said plurality of dynamic lists,
        add at least one first reference to said media content to a first dynamic list of said plurality of dynamic lists, and
        enable access to said first dynamic list by at least one first user of said second computer in accordance with sharing information provided by a second user of said first computer;
    wherein at least one of said plurality of dynamic lists comprises a hierarchy of said plurality of dynamic lists that are interrelated, said hierarchy being navigable by said second user;
    wherein at least a second dynamic list of said plurality of dynamic lists comprises a mediagram;

wherein said first computer is further configured to receive a changed version of said second dynamic list and store said changed version of said second dynamic list in a data store thereof; and wherein said changed version of said second dynamic list comprises at least one changed media attribute associated with media data referenced by said second dynamic list.

18. The system according to claim 1, wherein said first computer is further configured to generate a second dynamic list comprising a reference to at least a first set of said media data and at least one media attribute associated with said first set of media data, and communicate said second dynamic list to said second computer.

19. The system according claim 1, wherein said second computer is configured to receive said media content, and communicate said media content to at least one third computer, said third computer being a peer-to-peer computer or an offline playback client computer.

20. The system according to claim 17, wherein said first computer is further configured to compute popularity data for said media content based on user behavior, and create a second dynamic list comprising at least one second reference to said media content and a ranking of said media content based on said popularity data.

21. The system according to claim 17, wherein said first computer is further configured to receive authorization from said first user to reference an import list comprising a plurality of second list items in a second dynamic list, and generate said second dynamic list containing at least said reference to said import list and being automatically modifiable in response to changes in said import list.

22. The system according to claim 21, wherein said first computer is further configured to add at least one of a plurality of second list items to said second dynamic list.

23. The system according to claim 21, wherein said reference to said import list is added to said second dynamic list in response to a selection of said reference to said import list by said second user.

24. The system according to claim 17, wherein said first computer is further configured to generate a distribution list comprising export control data and a reference to at least one dynamic list of said plurality of dynamic lists that are to be exported to an external device, export said dynamic list referenced in said distribution list, and add a reference to said exported dynamic list to a second dynamic list in accordance with said export control data, said second dynamic list being dynamically modifiable in response to changes in said exported dynamic list.

25. The system according to claim 17, wherein at least one item of said plurality of first list items comprises a reference to a hierarchical list.

26. The system according to claim 25, wherein a reference to said media data is retrievable by traversing said hierarchical list.

27. The system according to claim 17, wherein said second computer is configured to receive at least one dynamic list of said plurality of dynamic lists from said first computer, display said received dynamic list to said first user, receive a user input selecting a list item of said received dynamic list containing a reference to said media data, download said media data in response to the reception of said user input.

28. The system according to claim 27, wherein said second computer is further configured to receive a notification that said media data has been changed, download said media data which has been changed in response to the reception of said notification, and notify said first user that said media data which has been changed has been downloaded.

29. The system according to claim 17, wherein said media data comprises at least one of audio data, video data, photographic data, textural data, database data, web content data, and programming code data.

30. The system according to claim 17, wherein at least one of said plurality of dynamic lists comprises content obtained by said first computer based on pre-defined criteria.

31. The system according to claim 17, wherein said first computer is further configured to generate a second dynamic list comprising a reference to at least a first set of said media data and at least one media attribute associated with said first set of media data, and communicate said second dynamic list to said second computer.

32. The system according claim 17, wherein said second computer is configured to receive said media content, and communicate said media content to at least one third computer, said third computer being a peer-to-peer computer or an offline playback client computer.

33. The system according to claim 17, wherein said first computer is further configured to communicate media data parameters to said second computer, said media data parameters indicating data formats that are supported by said first computer.

34. The system according to claim 17, wherein said first computer is further configured to communicate information to said second computer for enabling said second computer to obtain information specifying at least attribute associated with media data, and obtain information requesting that said media content be shared with at least one other device.

35. A system, comprising:

a first computer configured to receive first media content comprising at least one of audio data, video data, photographic data, textual data, database data, web content data, programming code data and at least one reference to second media content, add first media data to a first ordered list, said first media data comprising at least one reference to said first media content and a first set of media attributes, and communicate said first ordered list to a second computer;

said second computer configured to receive said first ordered list from said first computer, display said first ordered list to a user thereof, receive a first user input selecting a first list item of said first ordered list comprising a reference to said first media data, download said first media data and said first media content in response to the reception of said first user input, obtain a notification that said first media data has been modified, download said first media data which has been modified in response to said notification, generate a distribution list providing an underlying control structure for managing access and distribution of said first media data to at least one third computer, and communicate said reference to said first media data to said third computer; and said third computer configured to receive said reference to said first media data, add to a second ordered list said reference to said first media data, receive a second user input providing permission to allow access by at least one fourth computer to said first media content referenced by said first media data, and communicate said reference to said first media data to said fourth computer in response to the reception of said second user input.

36. A system, comprising:

a first computer configured to receive and store media content comprising media data for distribution to at least one second computer remote from said first computer, wherein said media content comprises at least one of audio data, video data, photographic data, textual data, database data, web content data, programming code data, and at least one reference to second media content, create a plurality of dynamic lists, each comprising a plurality of first list items which are arranged in a dynamically modifiable order, said dynamically modifiable order being changeable in response to an addition of a new list item to said plurality of dynamic lists, enable access by at least one second computer to at least one of said plurality of dynamic lists in accordance with system or user determined permissions, add at least one first reference to said media content to a first dynamic list of said plurality of dynamic lists, add at least one reference to said first dynamic list to a second dynamic list of said plurality of dynamic lists, wherein said first dynamic list and said second dynamic list comprise a hierarchy of interrelated dynamic lists, said hierarchy being navigable by said at least one second user of said second computer, compute popularity data for said media content based on user behavior, create a third dynamic list of the plurality of dynamic lists comprising at least one second reference to said media content and a ranking of said media content based on said popularity data, and add at least one of a plurality of second list items to a fourth dynamic list of the plurality of dynamic lists in response to a selection by said second user of said second computer;

said second computer configured to receive at least one dynamic list of said plurality of dynamic lists from said first computer, display said received dynamic list to said first user, receive a user input selecting a list item of said received dynamic list containing a reference to said media data, download said media content in response to the reception of said user input, and communicate said media content to at least one third computer identified in a distribution list, said third computer being a peer computer or an offline playback client computer.

37. The system according to claim 36, wherein said first computer is further configured to generate a distribution list comprising export control data and a reference to at least one dynamic list of said plurality of dynamic lists that are to be exported to an external device, export said dynamic list referenced in said distribution list, and add a reference to said exported dynamic list to a second dynamic list in accordance with said export control data, said second dynamic list being dynamically modifiable in response to changes in said exported dynamic list.

38. The system according to claim 36, wherein said second computer is further configured to receive a notification that said media content has been changed, download said media content which has been changed, and notify said second user of said second computer that said media content has been changed.

* * * * *

UNITED STATES PATENT AND TRADEMARK OFFICE
CERTIFICATE OF CORRECTION

| | | |
|---|---|---|
| PATENT NO. | : 8,725,832 B2 | Page 1 of 1 |
| APPLICATION NO. | : 13/196958 | |
| DATED | : May 13, 2014 | |
| INVENTOR(S) | : Bartholomew | |

It is certified that error appears in the above-identified patent and that said Letters Patent is hereby corrected as shown below:

In the Claims

Claim 36

Column 27, line 41, delete "said" after the phrase "navigable by".

Column 28, line 14, replace the phrase "to said first" with the phrase "to a first".

Signed and Sealed this
Sixteenth Day of September, 2014

Michelle K. Lee
*Deputy Director of the United States Patent and Trademark Office*